United States Patent
Ith et al.

(10) Patent No.: US 11,523,063 B2
(45) Date of Patent: Dec. 6, 2022

(54) SYSTEMS AND METHODS FOR PLACING ANNOTATIONS IN AN AUGMENTED REALITY ENVIRONMENT USING A CENTER-LOCKED INTERFACE

(71) Applicant: Microsoft Technology Licensing, LLC, Redmond, WA (US)

(72) Inventors: Cedric Khanntipo Ith, Seattle, WA (US); Gregory Bishop Bahm, Kirkland, WA (US); Xonatia Ravelle Lee, Seattle, WA (US); Josiah Michael McClanahan, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 85 days.

(21) Appl. No.: 17/212,735

(22) Filed: Mar. 25, 2021

(65) Prior Publication Data
US 2022/0311950 A1 Sep. 29, 2022

(51) Int. Cl.
*H04N 5/232* (2006.01)
*G06F 3/04815* (2022.01)
(Continued)

(52) U.S. Cl.
CPC ... *H04N 5/232945* (2018.08); *G06F 3/04815* (2013.01); *G06V 20/20* (2022.01); *G06T 19/006* (2013.01)

(58) Field of Classification Search
CPC ............ H04N 5/232945; G06T 19/006; G06F 3/04815; G06F 3/04817; G06F 3/011
See application file for complete search history.

(56) References Cited

U.S. PATENT DOCUMENTS

| 8,643,951 B1 * | 2/2014 | Wheeler | G06F 3/0481 |
| | | | 359/630 |
| 8,947,323 B1 * | 2/2015 | Raffle | G02B 27/0093 |
| | | | 345/157 |

(Continued)

FOREIGN PATENT DOCUMENTS

JP 2020531985 A * 11/2020

OTHER PUBLICATIONS

"Creating Screen Annotations for Objects in an AR Experience", https://web.archive.org/web/20201020160650if_/https:/developer.apple.com/documentation/arkit/creating_screen_annotations_for_objects_in_an_ar_experience, Oct. 20, 2020, 6 Pages.

(Continued)

*Primary Examiner* — John Villecco
(74) *Attorney, Agent, or Firm* — Fiala & Weaver P.L.L.C.

(57) ABSTRACT

Annotation techniques are implemented in an augmented reality environment. A user is presented with a GUI configured to place three-dimensional virtual annotations in an environment displayed via the user's computing device. The GUI presents a central GUI element that is center-locked with respect to the environment displayed via the user's computing device. The central GUI element is coplanar to a detected surface of the environment on which the central GUI element is virtually located. The annotation may be a three-dimensional arrow. While viewing the environment, a preview of the three-dimensional arrow pointing towards the central GUI element is presented to the user. Upon providing user input, the arrow is placed on the detected surface. The user may provide additional input that rotates the three-dimensional arrow around the central GUI element before placing the arrow.

20 Claims, 14 Drawing Sheets

(51) Int. Cl.
*G06V 20/20* (2022.01)
*G06T 19/00* (2011.01)

(56) References Cited

U.S. PATENT DOCUMENTS

| | | | | |
|---|---|---|---|---|
| 9,996,953 | B2* | 6/2018 | Patterson | G06F 16/4393 |
| 10,444,005 | B1 | 10/2019 | Dryer et al. | |
| 10,612,908 | B2* | 4/2020 | Dryer | H04N 5/232939 |
| 10,645,275 | B1* | 5/2020 | Chuah | H04N 5/232933 |
| 10,785,413 | B2* | 9/2020 | Malia | H04N 5/23222 |
| 10,937,247 | B1* | 3/2021 | Chuah | G06T 7/60 |
| 11,003,308 | B1* | 5/2021 | Dryer | G06F 3/011 |
| 11,023,093 | B2* | 6/2021 | Faulkner | G06F 3/04845 |
| 11,073,374 | B2* | 7/2021 | Paul | G06V 40/1306 |
| 11,073,375 | B2* | 7/2021 | Dryer | G06F 3/04847 |
| 11,138,771 | B2* | 10/2021 | Dryer | G06T 7/13 |
| 11,227,446 | B2* | 1/2022 | Malia | G06T 19/006 |
| 11,303,812 | B2* | 4/2022 | Malia | G11B 27/036 |
| 2015/0178257 | A1* | 6/2015 | Jones | G06T 19/006 |
| | | | | 345/419 |
| 2016/0055675 | A1* | 2/2016 | Kasahara | G02B 27/017 |
| | | | | 345/633 |
| 2016/0055676 | A1* | 2/2016 | Kasahara | G06T 19/003 |
| | | | | 345/633 |
| 2018/0101986 | A1 | 4/2018 | Burns et al. | |
| 2022/0101541 | A1* | 3/2022 | Smith | G06T 7/33 |

OTHER PUBLICATIONS

"Introduction—Welcome to Placenote SDK", Retrieved from: https://web.archive.org/web/20200810105557/https7docs.placenote.com/, Aug. 10, 2020, 2 Pages.

"Placing Objects and Handling 3D Interaction", Retrieved from: https://web.archive.org/web/20201112040304/https://developer.apple.com/documentation/arkit/world_tracking/placing_objects_and_handling_3d_interaction, Nov. 12, 2020, 6 Pages.

Mathew, Neil, "Design a Responsive 3D Cursor for ARKit Apps in Unity", Retrieved from: https://placenote.com/blog/real-world-cursor-with-arkit-hittest/, Feb. 13, 2020, 11 Pages.

Tseng, et al., "Annotate All! A Perspective Preserved Asynchronous Annotation System for Collaborative Augmented Reality", Retrieved from: https://xr.cornell.edu/s/32_Annotate_all_A_Perspective_Preserved_Asynchronous_Annotation_System_for_Collaborative_Augmented.pdf, 2019, pp. 1-3.

Vincent, et al., "Precise pointing techniques for handheld Augmented Reality", In Proceedings of the IFIP Conference on Human-Computer Interaction, Sep. 2, 2013, pp. 122-139.

* cited by examiner

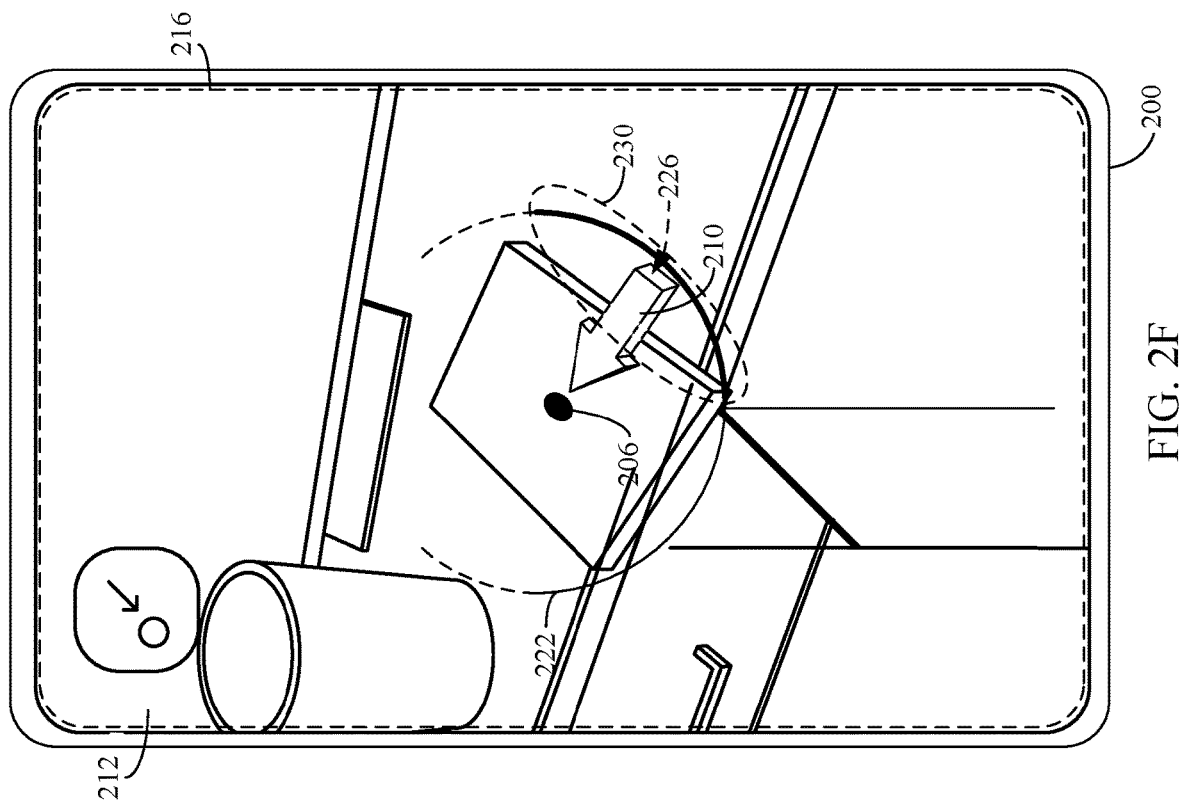
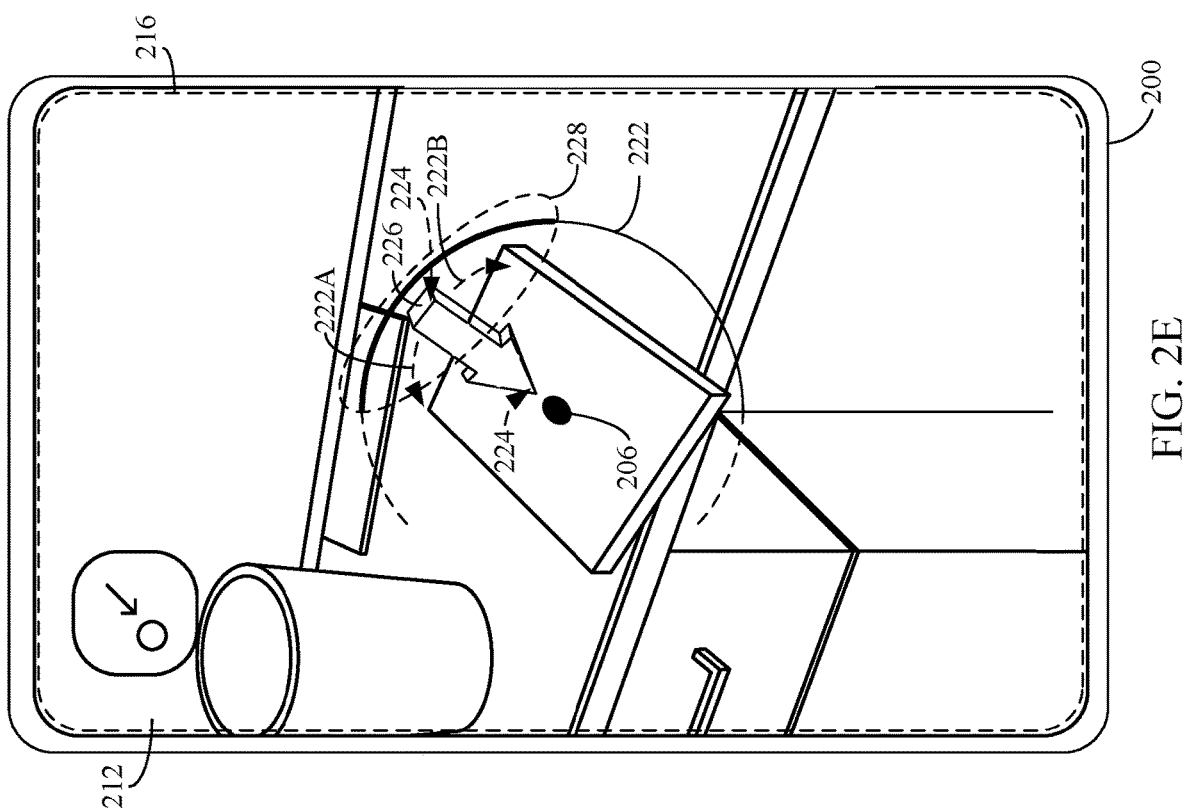
FIG. 2E
FIG. 2F

SYSTEMS AND METHODS FOR PLACING ANNOTATIONS IN AN AUGMENTED REALITY ENVIRONMENT USING A CENTER-LOCKED INTERFACE

BACKGROUND

Augmented Reality (AR) refers to a technology of inserting a virtual graphic (object) into an actual image acquired by a camera to generate an image in which a real object and a virtual object are both present. AR is characterized in that supplementary information using a virtual graphic may be provided onto an image acquired in the real world. Such AR is used in fields such as educational materials, road guidance, or games, and also is used as a user interface.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described herein for annotation techniques in an augmented reality environment. A user may be presented with a graphical user interface (GUI) configured to place three-dimensional virtual annotations in an environment displayed via the user's computing device. The GUI presents a central GUI element that is center-locked with respect to the environment displayed via the user's computing device. The central GUI element represents the precise location in which an annotation may be placed. The central GUI element may be coplanar to a detected surface of the environment on which the central GUI element is virtually located. The annotation may be a three-dimensional arrow or other annotation. While viewing the environment, a preview of the three-dimensional arrow pointing towards the central GUI element may be generated and displayed to the user. The preview may indicate the direction and/or scale of the arrow that is placeable on a detected surface. Upon providing user input, the three-dimensional arrow is placed on the detected surface on which the central GUI element is located. The user may provide additional input that rotates the three-dimensional arrow around the central GUI element before selecting the final position of the arrow. This provides a user an intuitive way to dictate the orientation of the arrow before placing it.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

FIGS. 2A-2K depict graphical interfaces for placing virtual annotations in an augmented reality environment in accordance with an example embodiment.

Figure 1:
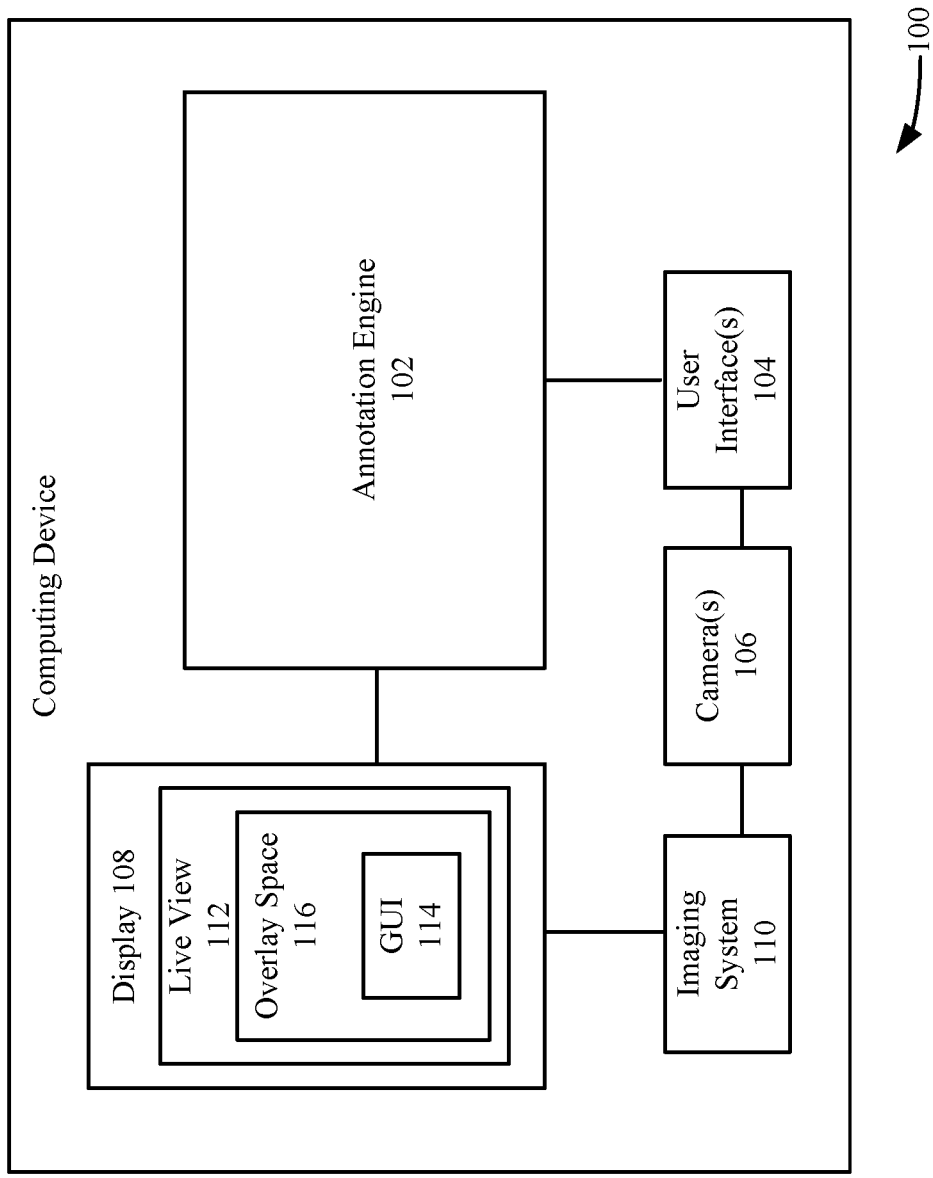
FIG. 1 shows a block diagram of a computing device for placing virtual annotations in an augmented reality environment in accordance with an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

Embodiments described herein are directed to annotation techniques in an augmented reality environment. For instance, a user may be presented with a graphical user interface (GUI) configured to place three-dimensional virtual annotations in an environment displayed via the user's computing device. The GUI presents a central GUI element that is center-locked with respect to the environment displayed via the user's computing device. The central GUI element represents the precise location in which an annotation may be placed. The central GUI element may be coplanar to a detected surface of the environment on which the central GUI element is virtually located. The annotation may be a three-dimensional arrow. While viewing the environment, a preview of the three-dimensional arrow pointing towards the central GUI element may be generated and presented to the user. The preview may indicate the direction and/or scale of the arrow that is placeable on a detected surface. Upon providing user input, the three-dimensional arrow is placed on the detected surface on which the central GUI element is located. The user may provide additional input that rotates the three-dimensional arrow around the central GUI element before placing the arrow. This provides a user an intuitive way to dictate the orientation of the arrow before placing it.

As described above, the central GUI element enables a more accurate annotating experience, as the user is presented with the precise location on which an annotation is placed. Conventional techniques enable a "tap-to-place" model where a user is enabled to tap anywhere on the screen to place an annotation at the location at which the screen is tapped. During this process, the screen becomes obscured by the user's finger while the user attempts to place the annotation, thereby leading to an annotation being inadvertently placed in an undesired location.

Moreover, because the techniques described herein allow annotation placement at the center of their device's screen, users have to move their device in order to place annotations at their intended locations. This additional movement of the device causes the device to capture more visual data about the user's environment. The visual data is utilized to map the user's environment and determine feature points that are utilized to detect surfaces in the user's environment. The more visual data that is obtained, the more accurate the surface detection and annotation placement.

For example, FIG. 1 shows a block diagram of a computing device 100 for placing virtual annotations in an augmented reality environment, according to an example embodiment. As shown in FIG. 1, computing device 100 comprises an annotation engine 102, one or more user interfaces 104, one or more cameras 106, a display 108, and an imaging system 110. User interface(s) 104 enable a user to interact with computing device 100 and an operating system and/or applications installed and executing thereon. User interface(s) 104 include any number and combination of user interface elements, such as, but not limited to a capacitive touch screen provided via a display (e.g., display 108) by which a user provides touch-based input, for example, via a stylus or finger. User interface(s) 104 may also include a mouse, a keyboard, a thumb wheel, a roller ball, any number of virtual interface elements (e.g., such as a virtual keyboard or other graphical user interface (GUI) elements rendered on and displayed by a display (e.g., display 108)), a voice recognition system, and/or other user interface elements described elsewhere herein or otherwise known.

Display 108 may be a light emitting diode (LED) display, an organic LED (OLED) display, an active-matrix OLED (AMOLED) display, a liquid crystal display (LCD) display, a plasma display, or any other suitable display device/screen type.

Examples of computing device 100 include, but are not limited to, a smart phone, a tablet, a cell phone, a personal data assistant, a tablet, a desktop or laptop computer, etc. In certain embodiments, computing device 100 is a pair of virtual or augmented reality glasses or goggles. In accordance with such embodiments, display 108 may be integrated in a lens (or two lenses) of the pair of virtual or augmented reality glasses or goggles.

Camera(s) 106, when activated, are configured to continuously detect light transmitted through the lenses thereof. The detected light is provided to imaging system 110, e.g., comprising an image sensor and/or an image signal processor, which converts the light into electrical signals (e.g., voltage or digital signals) corresponding to an image. The detected images are continuously provided to display 108. Display 108 displays, in real time, the detected images as a live view 112 (also referred to as a "live preview") of the environment or scene detected by camera(s) 106. As used herein, "live view" is the current view of an environment presented to the user via display 108 as perceived by camera(s) 106 and imaging system 110. One or more GUI elements may be overlayed on live view 112 presented via display 108 that enable the user to take a picture, record a video, initiate a video call, etc.

Annotation engine 102 is configured to provide a GUI 114 that is overlayed on live view 112, which enables a user to place virtual, three-dimensional annotations in an environment presented via live view 112 (thereby providing an augmented reality experience). Annotation engine 102 may comprise a software application executing on computing device 102 or may be incorporated as part of the operating system (not system) of computing device 102. The three-dimensional annotations may be placed within a three-dimensional virtual overlay space 116 provided by annotation engine 102. Three-dimensional virtual overlay space 116 may comprise a transparent layer that is overlayed on live view 112 by which a user may place three-dimensional annotations in various positions therein. For instance, annotation engine 102 may render a central GUI element that is locked to a center of live view 112. The central GUI element remains locked to the center of live view 112 as the user moves computing device 100 around the user's environment. Thus, regardless of what is displayed via live view 112, the central GUI element remains in the center of live view 112. In accordance with an embodiment, the central GUI element may be circular reticle. The circular reticle may comprise a reticle dot centrally-located within the circular reticle. The reticle dot represents the location in which an annotation may be placed within three-dimensional virtual overlay space 116. In accordance with another embodiment, the central GUI element may comprise another shape, such as, but not limited to, a rectangular shape, a triangular shape, a polygonal shape, a crosshair shape, etc., and may or may not comprise a reticle dot (or other shape) centrally-located therewithin.

In accordance with an embodiment, the central GUI element may be coplanar with a surface detected in the environment that is proximate to the center of live view 112. For example, as the user move camera(s) 106 within the user's environment, annotation engine 102 may continuously detect surfaces that are located proximate to the center of live view 112. Upon detecting such a surface, annotation engine 112 may render the central GUI element such that it is coplanar with that surface. Additional details regarding detecting coplanar surfaces within live view 112 are described below with reference to FIGS. 4-6.

In accordance with an embodiment, the annotation is a three-dimensional arrow. The three-dimensional arrow may be initially displayed in a fixed or locked position in three-dimensional virtual space 116 overlayed on live view 112. The three-dimensional arrow may be unidirectional, where the arrow points towards the center of the central GUI element. For example, the three-dimensional arrow may point towards the reticle dot of the central GUI element. The three-dimensional arrow may be initially translucent (e.g., partially see-through) such that a user may view the environment located behind the three-dimensional arrow. The size of the three-dimensional arrow may be based on the distance between the detected surface and camera(s) 106. For instance, the further away the detected distance, the smaller the size of the three-dimensional arrow. Conversely, the closer the detected distance, the larger the size of the three-dimensional arrow.

The user may place the three-dimensional arrow on a detected surface by providing user input. For instance, the user may provide touch input (e.g., a tap) via display 108, which causes the three-dimensional arrow to be anchored to a position in three-dimensional virtual overlay space 116 corresponding to the detected surface. Upon placing the three-dimensional arrow, annotation engine 102 may render the three-dimensional arrow such that is opaque, although the embodiments described herein are not so limited.

Figure 2B:
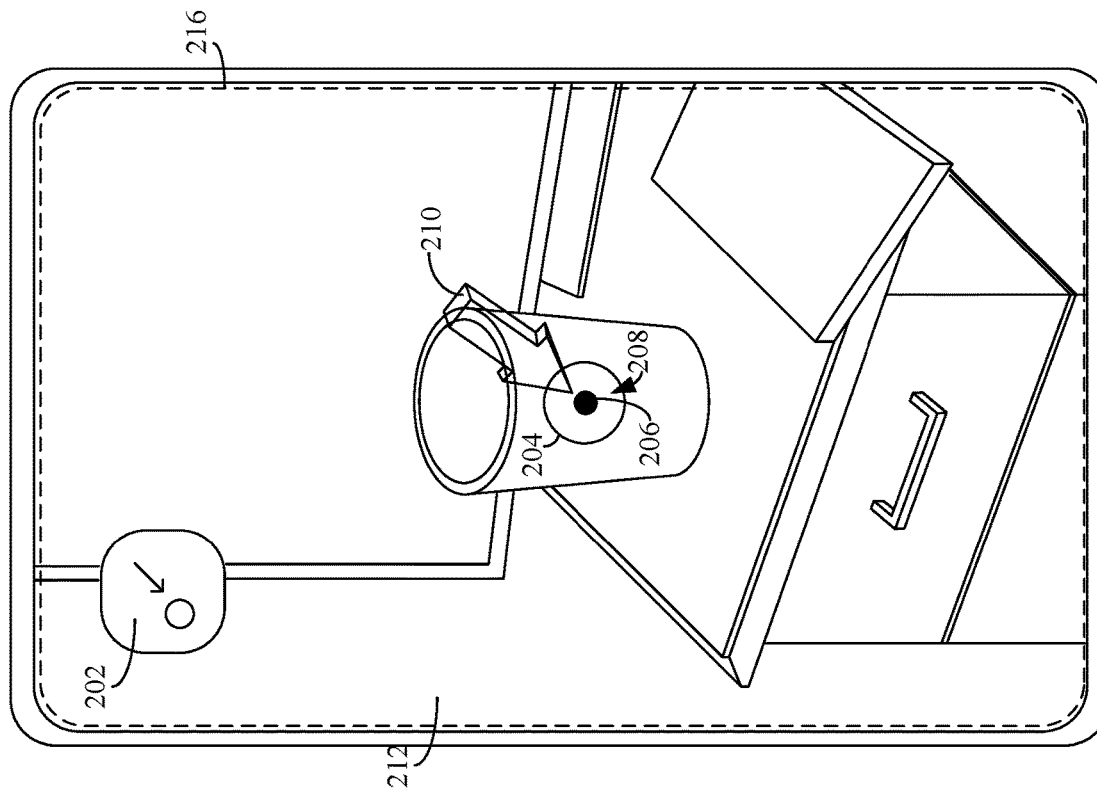
Figure 2A:
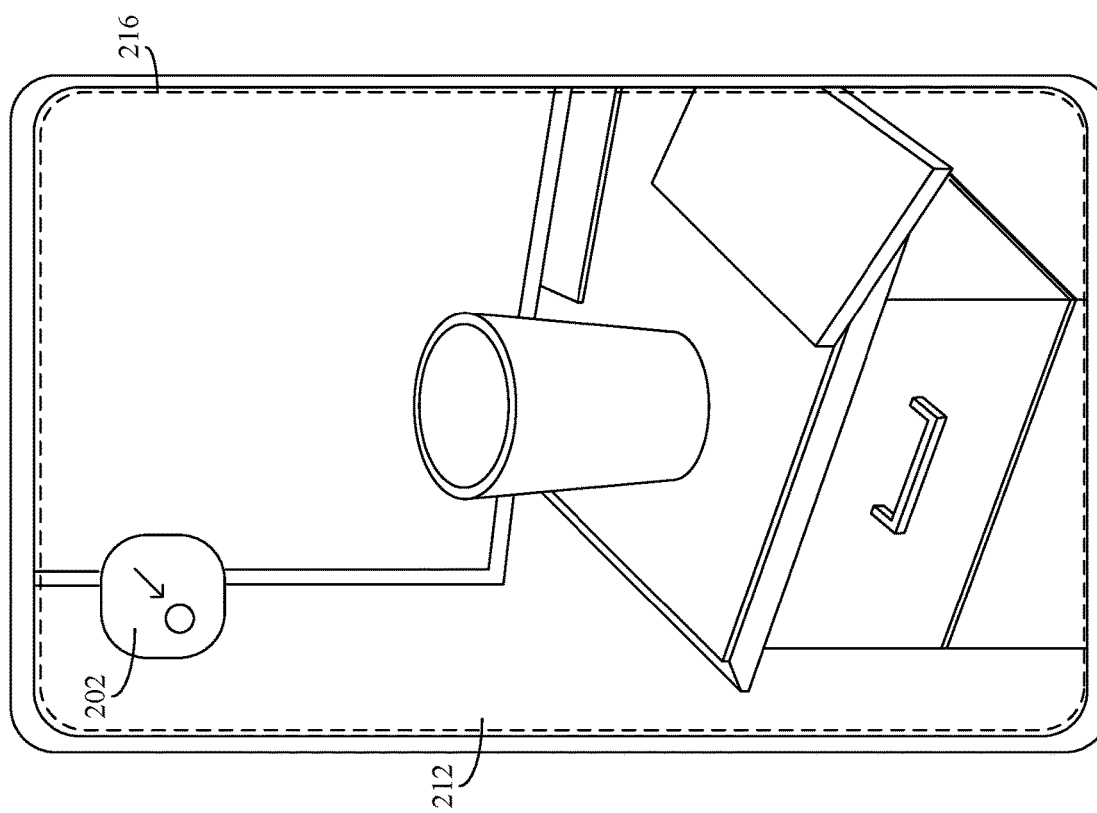

For example, FIG. 2A shows a graphical interface for placing an annotation in a first position in a three-dimensional virtual space 216 overlayed on a live view 212 displayed by a display of a computing device 200 in accordance with an example embodiment. In FIG. 2A, a display of a smart phone 200 is shown, although the embodiments described herein are not so limited. Smart phone 200 is an example of computing device 100, as described above with reference to FIG. 1.

As shown in FIG. 2A, a display of smart phone 200 displays live view 212 of an environment or scene detected by camera(s) (e.g., camera(s) 106, as shown in FIG. 1) of smart phone 200. Live view 212 is an example of live view 112, as shown in FIG. 1. The camera(s) may be located on a side of smart phone 200 that is opposite to the side on which the display of smart phone 200 (as shown in FIG. 2A) is located. As further shown in FIG. 2A, a GUI element 202 may be rendered over live view 212. GUI element 202 may be part of GUI 114 provided by annotation engine 102 (as shown in FIG. 1). GUI element 202, when activated, may initiate an annotation mode that enables the user to place virtual annotations over live view 212 via three-dimensional virtual overlay space 216. Three-dimensional virtual overlay space 216 is an example of three-dimensional virtual overlay space 116, as shown in FIG. 1. GUI element 202 may be activated via user input received via user interface(s) 104. Examples of such user input include, but are not limited, a touch input (e.g., a tap) via the display (e.g., display 108), a mouse click, interaction with a particular key of a keyboard, voice input, etc.

FIG. 2B shows a graphical interface displayed via smart phone 200 upon activation of the annotation mode in accordance with an example embodiment. As shown in FIG. 2B, responsive to activating GUI element 202, annotation engine 102 renders a central GUI element 204 in three-dimensional virtual overlay space 216. Central GUI element 204 is rendered at and remains locked to a center of live view 212. As also shown in FIG. 2B, annotation engine 102 renders reticle dot 206 that is centrally-located within central GUI element 204. As further shown in FIG. 2B, both central GUI element 204 and reticle dot 206 are both coplanar with a surface 208 (the front of the cup depicted in live view 212) detected by annotation engine 102 in live view 212. As further shown in FIG. 2B, annotation engine 102 renders a three-dimensional arrow 210 at a first position in three-dimensional virtual overlay space 216. Three-dimensional arrow 210 is pointed towards the center of central GUI element 204. In the example shown in FIG. 2B, the center of central GUI element 204 comprises reticle dot 206. Accordingly, three-dimensional arrow 210 is pointed towards reticle dot 206. As also shown in FIG. 2B, three-dimensional arrow 210 is translucent. Accordingly, the objects behind three-dimensional arrow 210 are visible to the user.

Figure 2D:
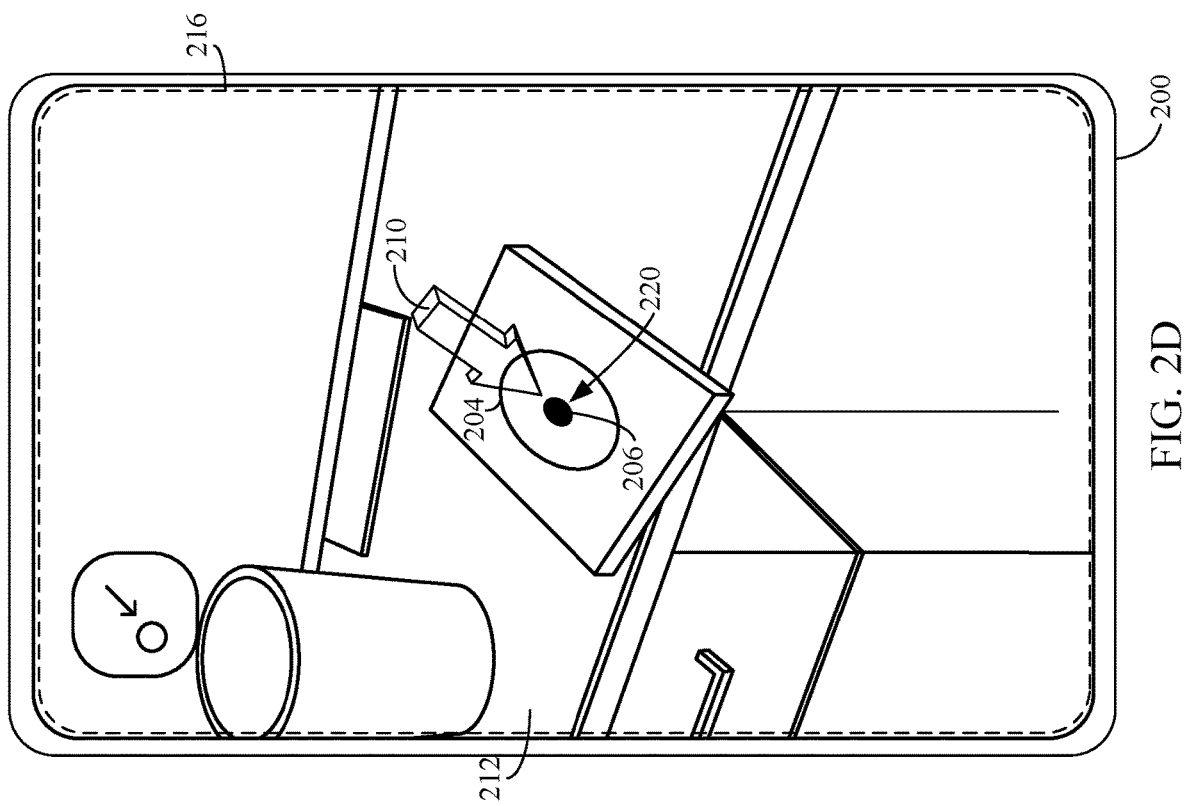
Figure 2C:
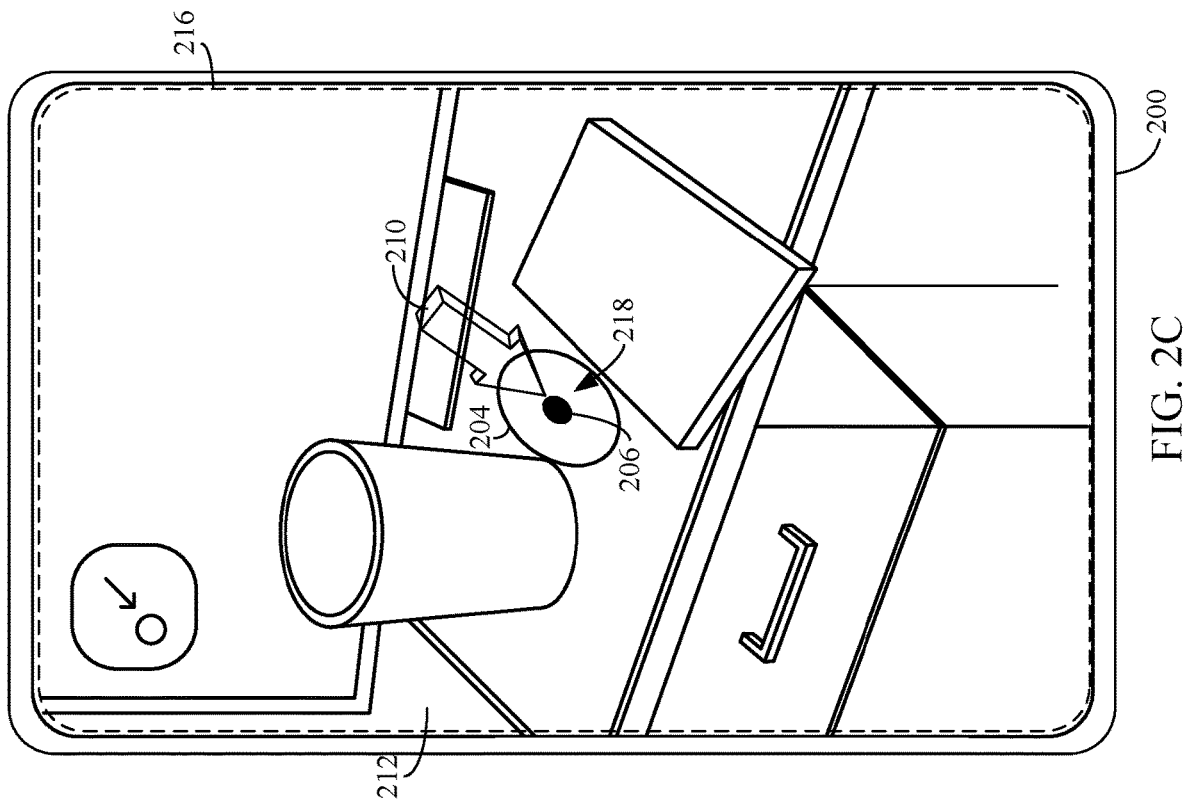

As shown in FIGS. 2C and 2D, as the user moves camera(s) 106 and points camera(s) 106 to other objects in the environment, central GUI element 206, reticle dot 208, and three-dimensional arrow 210 remain center-locked with respect to live view 212. In the example shown in FIGS. 2C and 2D, the user is panning camera(s) 106 to the right. As shown in FIG. 2C, central GUI element 204 and reticle dot 206 are now over a detected surface 218 (the top surface of the desk depicted in live view 212) having a different plane orientation/angle relative to surface 208 in FIG. 2B. Accordingly, central GUI element 204 and reticle dot 206 are generated to be displayed coplanar with respect to surface 218 (i.e., at the orientation/angle of surface 218). As shown in FIG. 2D, central GUI element 204 and reticle dot 206 are displayed over a detected surface 220 (the top surface of the book depicted in live view 212) having a different plane orientation/angle than surface 218 of FIG. 2C. Accordingly, central GUI element 204 and reticle dot 206 are generated to be displayed coplanar with respect to surface 220 (i.e., at the orientation/angle of surface 220).

Upon placing the three-dimensional arrow, annotation engine 102 may render another three-dimensional arrow that is initially displayed in a fixed position in three-dimensional virtual space 216 overlayed on live view 212 and that points towards the center of the central GUI element. This way, the user is enabled to place another three-dimensional arrow in the environment represented by live view 212. While the user moves camera(s) 106 in the user's environment, the first three-dimensional arrow placed by the user remains anchored to the surface on which the first three-dimensional arrow was placed via three-dimensional virtual overlay space 216. Moreover, the size of the first three-dimensional arrow and/or the angle at which the first three-dimensional arrow is displayed may vary depending on the distance between the surface to which the first three-dimensional arrow is anchored and the angle at which the surface is viewed via live view 212.

Referring again to FIG. 1, in accordance with an embodiment, annotation engine 102 enables a user to rotate the three-dimensional arrow to another position before anchoring the three-dimensional arrow to a detected surface via three-dimensional virtual overlay space 116. For example, a user may provide touch input (e.g., a press-and-hold input) via display 108, which causes the three-dimensional arrow to be rotatable around the central GUI element and/or its associated reticle dot. The three-dimensional arrow may be rotated to a position other than the original position at which the three-dimensional arrow was rendered. For example, while maintaining contact with display 108 (e.g., via a finger or stylus), may drag or rotate the three-dimensional arrow to another position. During rotation, the three-dimensional arrow is maintained continuously pointed towards the center of the central GUI element. The three-dimensional arrow may also be rendered in an opaque fashion during rotation, although the embodiments described herein are not so limited. For example, the three-dimensional arrow may remain translucent.

The user may lock the three-dimensional arrow to a new position based on additional user input. For instance, the user may remove his or her finger or stylus from display 108 after rotation. Responsive to detecting such user input, annotation engine 102 locks the three-dimensional arrow in the position at which the user removes his or her finger or stylus and/or renders the three-dimensional arrow in an opaque fashion, or alternatively, in a translucent fashion. It is noted that while the user input described above is described with reference to touch screen-based input, the embodiments are not so limited. For instance, the user may provide user input to place an annotation, such as a three-dimensional arrow, and/or rotate an annotation via other types of input, such as, but not limited to, mouse-based input, keyboard-based input, voice-based input, etc.

FIGS. 2E-2H show graphical interfaces displayed via smart phone 200 upon detecting input for rotating a three-dimensional arrow in accordance with an example embodiment. As shown in FIG. 2E, the user has provided user input (e.g., press-and-hold input) that enables three-dimensional arrow 210 to be rotated. Responsive to detecting such user input, annotation engine 102 may remove central GUI element 204 and/or display a guide GUI element 222. Alternatively, annotation engine 102 may expand central GUI element 204 into guide GUI element 222. Guide GUI element 222 comprises at least a portion of a circular graphical user interface element (e.g., a semi-circle, a major arc of a circle, etc.). Guide GUI element 222 represents a path that a user may rotate three-dimensional arrow 210 in one of two different directions 222A or 222B. It is noted that direction 222A or direction 222B are shown for illustrative purposes and may not be rendered by annotation engine 102 and viewable by the user. Although, in certain embodiments, arrows representing directions 222A and/or 222B may be rendered and presented to a user.

As further shown in FIG. 2E, a portion 228 of guide GUI element 222 may be more prominently visible than other portions of guide GUI element 222. That is, focus may be provided to portion 228 and not to other portions of guide GUI element 222. For example, the portion of guide GUI element 222 proximate to an end of three-dimensional arrow 210 may be more prominently visible. For instance, three-dimensional arrow 210 comprises a directional end 224 and an end 226 that is distal to reticle dot 206. Portion 228 of guide GUI element 222 proximate to end 226 may be displayed more prominently visible. Portion 228 may be rendered more prominently visible using various techniques. For instance, annotation engine 102 may render portion 228 such that it is thicker or brighter than other portions of guide GUI element 222. In another embodiment, annotation engine 102 may render portion 228 such that it is a solid, opaque line, while other portions of GUI element 222 are faded and/or translucent.

Figure 2H:
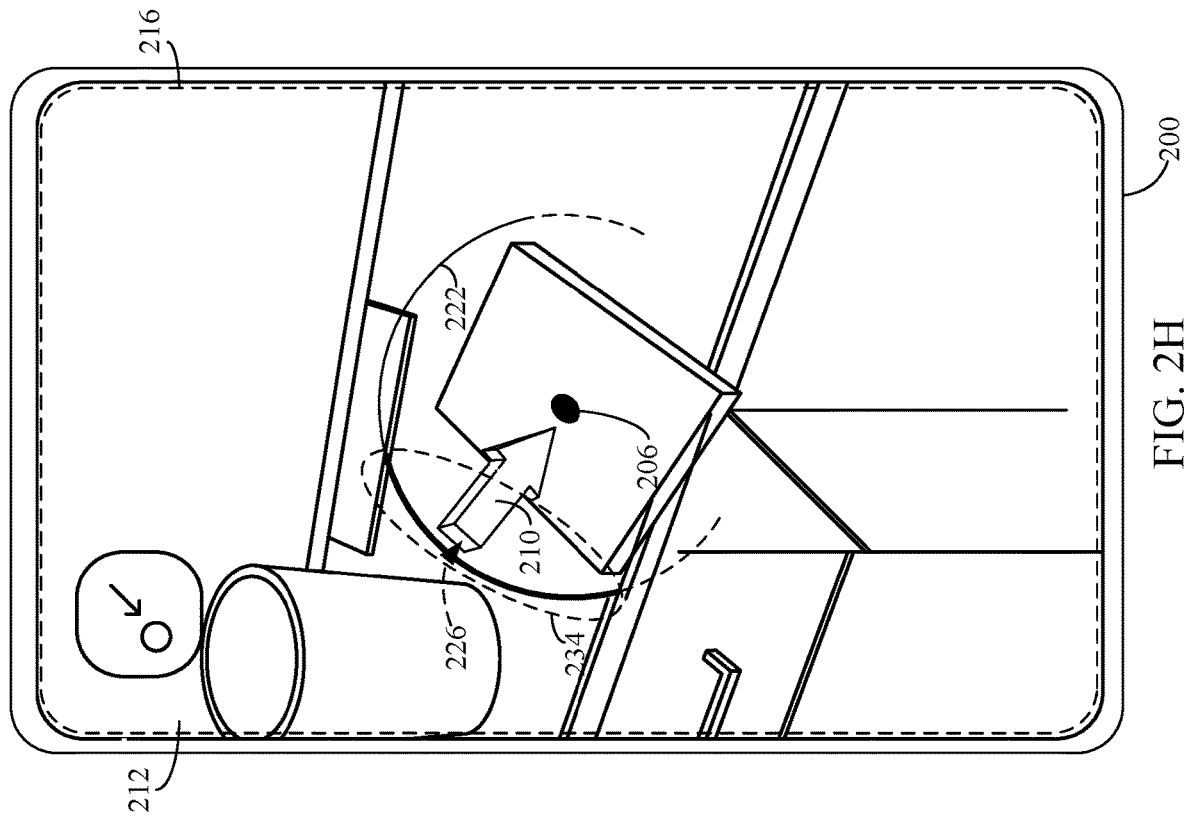
Figure 2G:
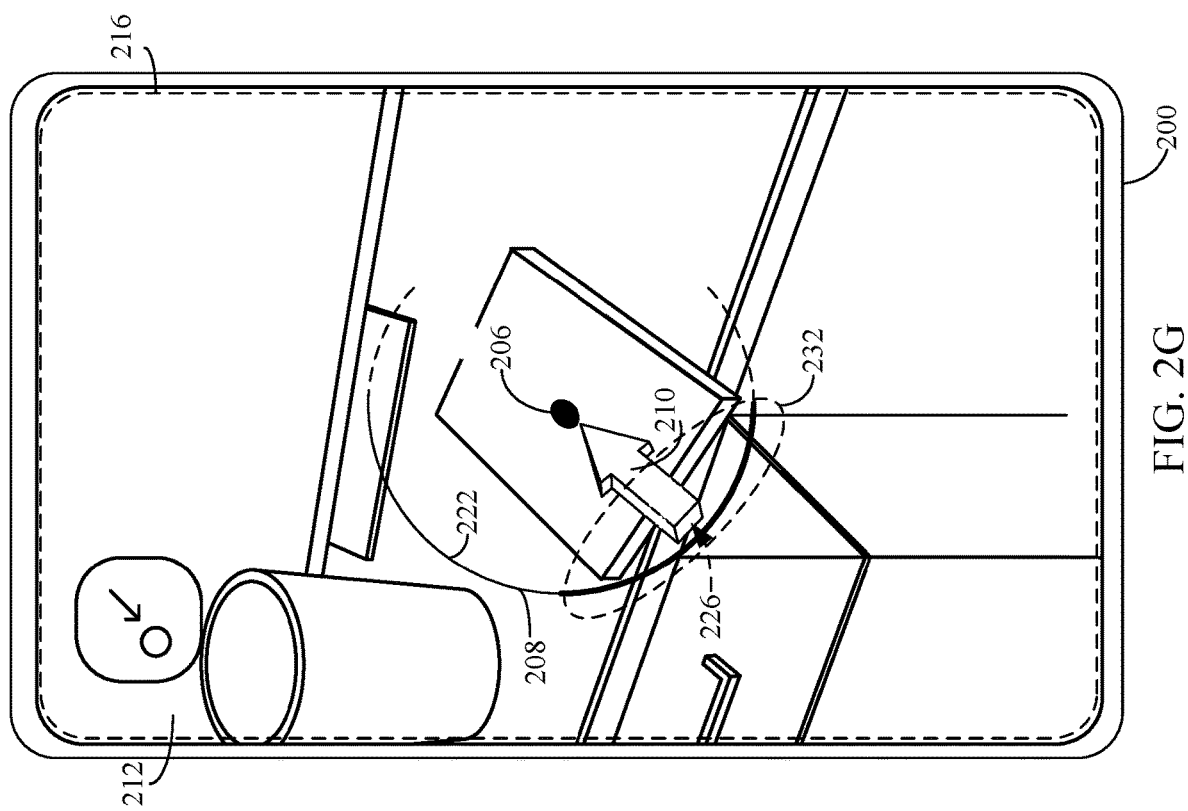

As the user rotates three-dimensional arrow 210, a different portion of guide GUI element 222 that is proximate to distal end 226 is made more prominently visible, while other portions of guide GUI element 222 are not provided focus and/or no longer rendered. That is, the portion of guide GUI element 222 that is made more prominently visible dynamically changes based on the position of distal end 226 of three-dimensional arrow 210. For example, as shown in FIG. 2F, a user has rotated three-dimensional arrow 210 to a different position. Accordingly, a portion 230 of guide GUI element 222 proximate to distal end 226 is now made more prominently visible. As shown in FIG. 2G, a user has rotated three-dimensional arrow 210 to a further position. Accordingly, a portion 232 of guide GUI element 222 proximate to distal end 226 is now rendered more prominently visible. As shown in FIG. 2H, a user has rotated three-dimensional arrow 210 to a yet a further position. Accordingly, a portion 234 of guide GUI element 222 proximate to distal end 226 is now rendered more prominently visible.

As also shown in FIGS. 2E-2H, annotation engine 102 renders three-dimensional arrow 210 in an opaque fashion during rotation, thereby giving the user a preview of how three-dimensional arrow 210 will be displayed in live view 212. However, it is noted in other embodiments, annotation engine 102 may render three-dimensional arrow 210 in a translucent fashion during rotation.

Figure 2J:
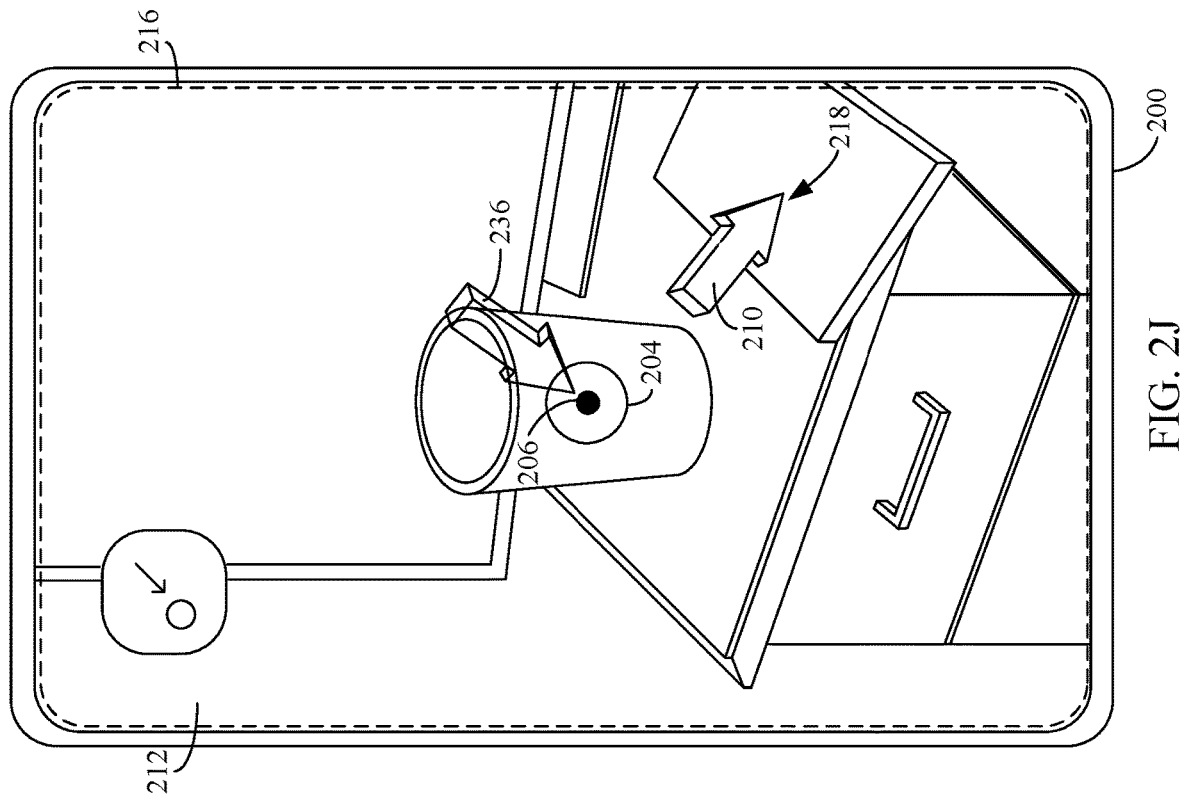
Figure 2I:
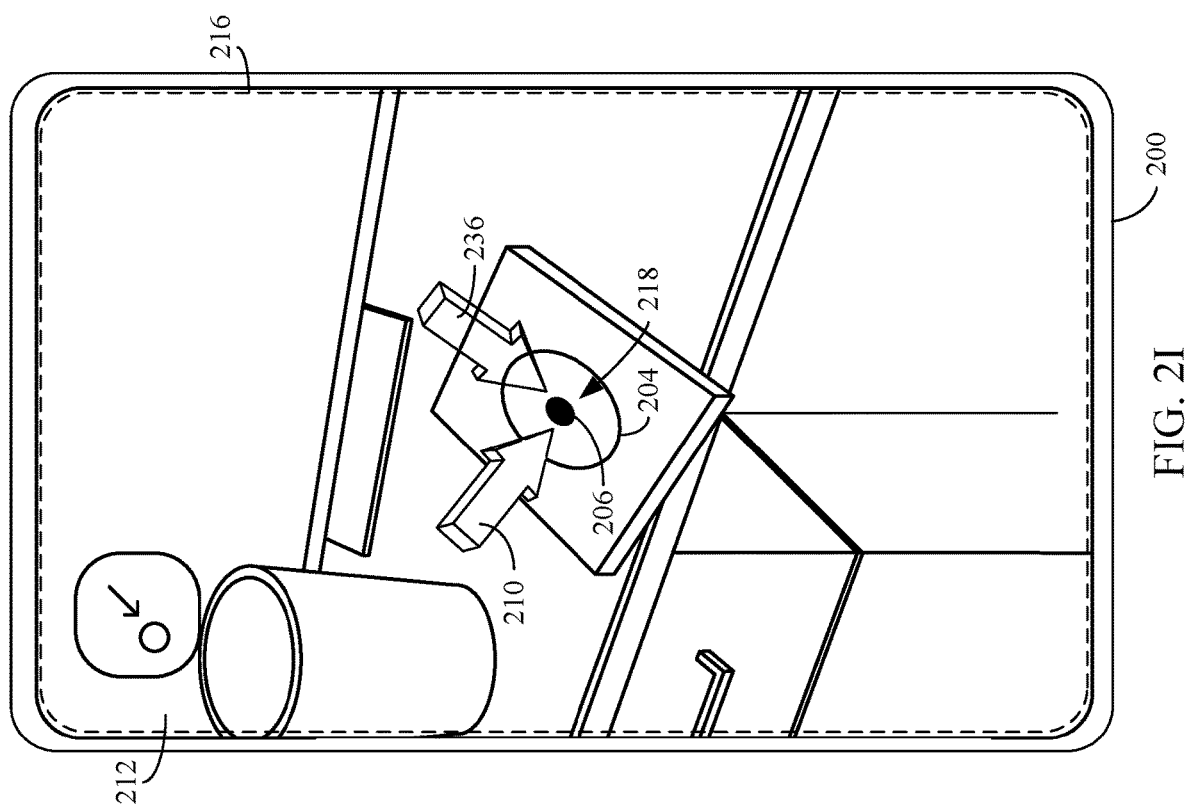

FIG. 2I shows a graphical interface displayed via smart phone 200 upon detecting user input that locks a rotated three-dimensional arrow to a designated position in accordance with an example embodiment. As shown in FIG. 2I, responsive to detecting user input that causes three-dimensional arrow 210 to be locked to a position to which three-dimensional arrow 210 was rotated, annotation engine 102 locks three-dimensional arrow 210 to the position, re-renders central GUI element 204, and/or no longer renders guide GUI element 208. Annotation engine 102 also anchors three-dimensional arrow 210 to surface 218 via three-dimensional virtual overlay space 216. Moreover, annotation engine 102 renders a second three-dimensional arrow 236 at the first position in three-dimensional virtual overlay space 216. As the user moves camera(s) 106 to point to other locations within the environment, three-dimensional arrow 210 remains locked to the position at which it was placed via three-dimensional virtual overlay space 216, whereas second three-dimensional arrow 236, central GUI element 204 and reticle dot 206 remain center-locked with respect to live view 212.

For example, as shown in FIG. 2J, a user has panned camera(s) 106 to the left. Three-dimensional arrow 210 remains anchored to surface 218, whereas central GUI element 204, reticle dot 206 and three-dimensional arrow 234 remain center-locked with respect to live view 212.

Figure 2K:
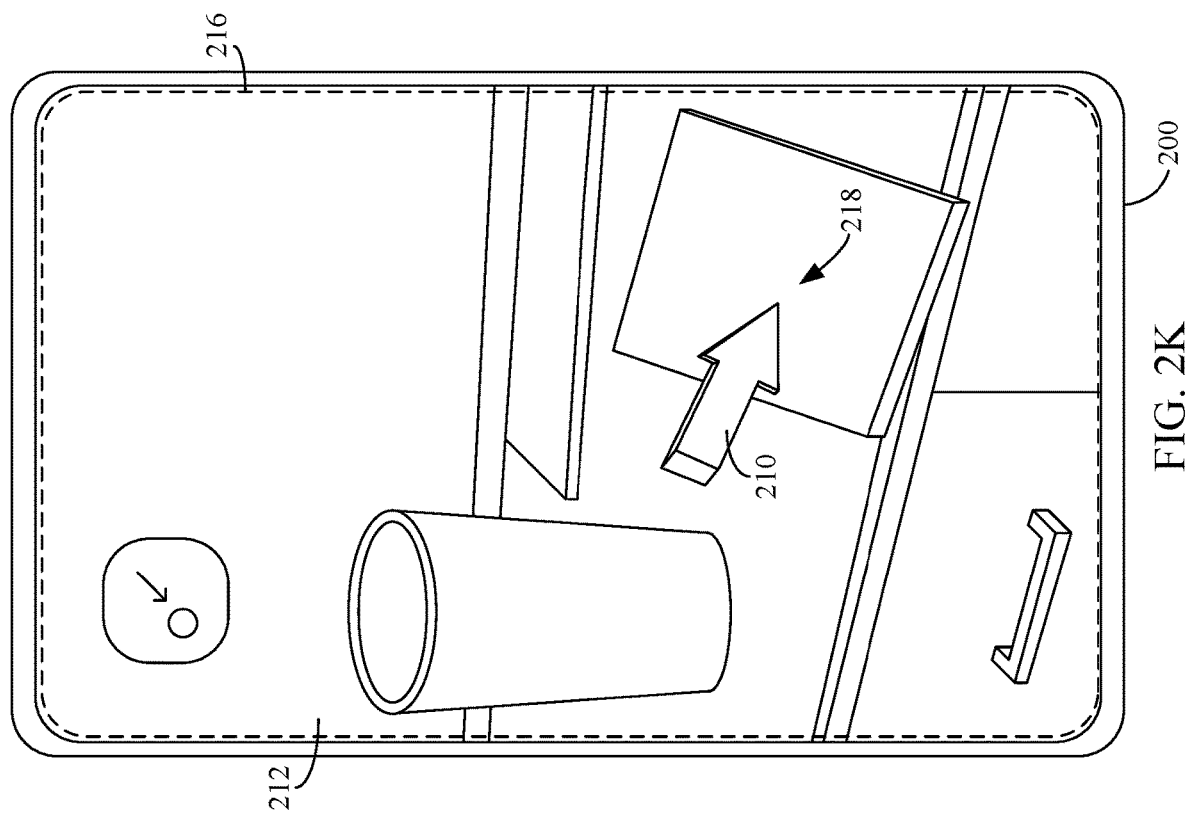

A user may place any number of three-dimensional arrows (e.g., three-dimensional arrows 210 and 236) within live view 212 via three-dimensional virtual overlay space 216. A three-dimensional arrow locked and anchored to a surface exists within a three-dimensional space such that the size and manner in which such three-dimensional arrows are displayed vary depending on the distance between the surface to which the first three-dimensional arrow is anchored and the angle at which the surface is viewed via live view 212. For example, as shown in FIG. 2K, a user has moved camera(s) 106 to the right and closer to surface 218 (when compared to FIG. 2I). Accordingly, the size of three-dimensional arrow 210 is larger than compared to three-dimensional arrow 210 shown in FIG. 2I. Moreover, the perspective at which three-dimensional arrow 210 is adjusted accordingly. The manner in which the size and/or orientation in which anchored three-dimensional arrows are displayed may be based on feature points that are detected within live view 212. Additional details regarding the detection of feature points are described below with reference to FIGS. 4-6.

Figure 3:
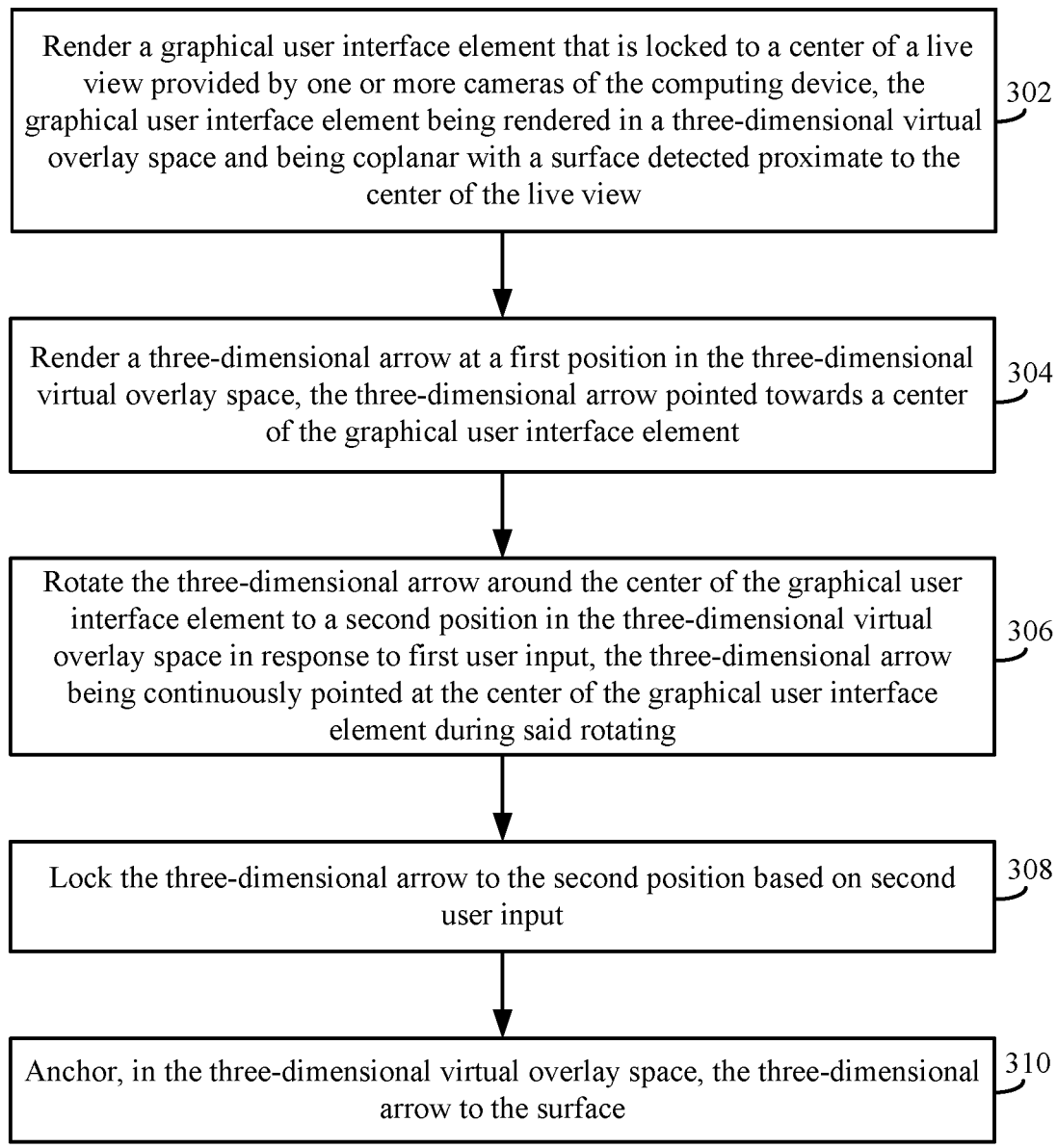
FIG. 3 shows a flowchart of a method for placing annotations in an augmented reality environment in accordance with an example embodiment.

Accordingly, virtual annotations may be placed in many ways. For example, FIG. 3 shows a flowchart 300 of a method for placing virtual annotations in an augmented reality environment in accordance with an example embodiment. In an embodiment, flowchart 300 may be implemented by system 100 shown in FIG. 1, although the method is not limited to that implementation. Accordingly, flowchart 300 will be described with continued reference to FIG. 1, along with FIGS. 2B and 2E-2I. Other structural and operational embodiments will be apparent to persons skilled in the relevant art(s) based on the discussion regarding flowchart 300 and system 100 of FIG. 1.

Flowchart 300 begins with step 302. In step 302, a GUI element that is locked to a center of a live view provided by camera(s) of the computing device is rendered. The GUI element is rendered in a three-dimensional virtual overlay space and is coplanar with a surface detected proximate to the center of the live view. For example, with reference to FIGS. 1 and 2B, annotation engine 102 renders central GUI element 204. Central GUI element 204 is locked to a center of live view 212 provided by camera(s) 106 of computing device 200. Central GUI element 204 is rendered in three-dimensional virtual overlay space 216 and is coplanar with detected surface 208, which is proximate to the center of live view 212.

In accordance with one or more embodiments, the GUI element is a circular reticle comprising a reticle dot centrally-located within the circular reticle. For example, as shown in FIG. 2B, central GUI element 204 is a circular reticle comprising reticle dot 206 centrally-located therewithin. In other embodiments, the GUI element may have other shape, including being oval, elliptical, rectangular, triangular, etc., and may have any suitable size.

At step 304, a three-dimensional arrow is rendered at a first position in the three-dimensional virtual overlay space. The three-dimensional arrow is pointed towards a center of the GUI element. For example, with reference to FIGS. 1 and 2B, annotation engine 102 renders three-dimensional arrow 210 at a first position in three-dimensional virtual overlay space 216. Three-dimensional arrow 210 is pointed towards reticle dot 206, which is centrally-located within central GUI element 204. Note that in embodiments, arrow 210 may be rendered to have any suitable length and/or width.

In accordance with one or more embodiments, based on the first user input, at least a portion of a circular GUI element that at least partially encircles the reticle dot is rendered. The three-dimensional arrow is positioned inside the rendered at least a portion of the circular graphical user interface. For example, with reference to FIGS. 1 and 2E, based on detecting first user input, annotation engine 102 renders guide GUI element 222 that at least partially encircles reticle dot 206. Three-dimensional arrow 210 is positioned inside of guide GUI element 222.

At step 306, the three-dimensional arrow is rotated around the center of the GUI element to a second position in the three-dimensional virtual overlay space in response to first user input. The three-dimensional arrow is continuously pointed at the center of the GUI element during rotation. For example, with reference to FIGS. 1 and 2E-2H, annotation engine 102 detects first user input that causes three-dimensional arrow 210 to be rotated around reticle dot 206. Three-dimensional arrow 210 is continuously pointed at reticle dot 206 during rotation.

In accordance with an embodiment, the rendered at least a portion of the circular graphical user interface dynamically changes during said rotating such that the rendered portion is proximate to an end of the three-dimensional arrow that is distal to the graphical user interface element locked to the center of the live view. For example, with reference to FIGS. 1 and 2E-2H, guide GUI element 222 dynamically changes during rotation of three-dimensional arrow 210 such that the rendered portion (e.g., portions 228, 230, 232, and 234) is proximate to distal end 226 of three-dimensional arrow 210.

In accordance with one or more embodiments, the three-dimensional arrow is translucent when rendered at the first position and is opaque during rotating. For example, with reference to FIG. 1, annotation engine 102 renders three-dimensional arrow 210 in a translucent fashion when it is rendered at the first position (as shown in FIG. 2B) and renders three-dimensional 210 in an opaque fashion during rotating (as shown in FIGS. 2E-2H).

At step 308, the three-dimensional arrow is locked to the second position based on second user input. For example, with reference to FIGS. 1 and 2I, annotation engine 102 detects second user input that locks three-dimensional arrow 210 to the second position.

In accordance with one or more embodiments, subsequent to said locking, a second three-dimensional arrow is rendered at the first position, the second three-dimensional arrow being pointed towards the center of the GUI element locked to the center of the live view. For example, with reference to FIGS. 1 and 2I, subsequent to locking three-dimensional arrow 210 to the second position, annotation engine 102 renders second three-dimensional arrow 236 at the first position. Three-dimensional arrow 236 is pointed towards the center of central GUI element 204 locked to the center of live view 212.

At step 310, the three-dimensional arrow is anchored, in the three-dimensional virtual overlay space, to the surface. For example, with reference to FIGS. 1 and 2I, annotation engine 102 anchors three-dimensional arrow 210, in three-dimensional virtual overlay space 216, to detected surface 218.

Figure 4:
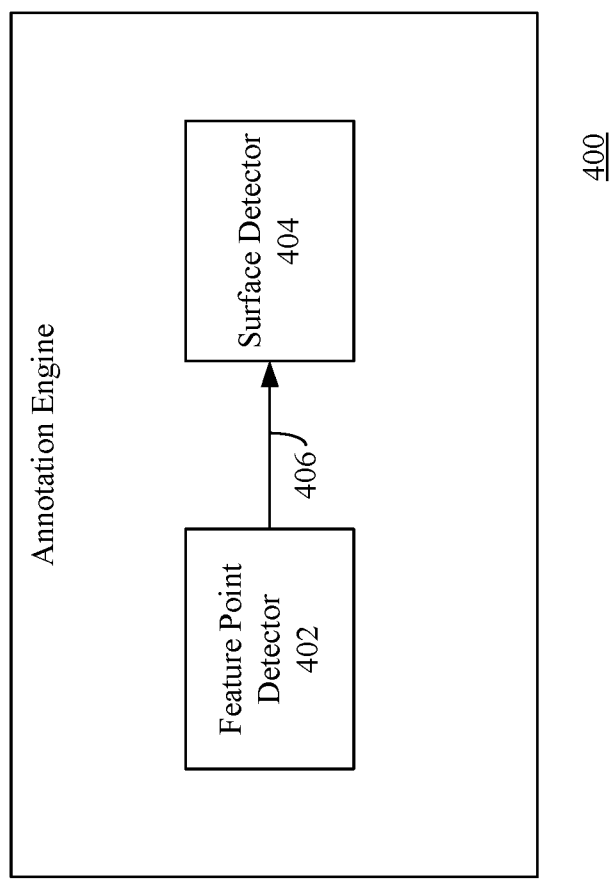
FIG. 4 depicts a block diagram of an annotation engine that is configured to detect surfaces in a live view displayed by a computing device in accordance with an example embodiment.

As described above, surfaces that are proximate to the center of a live view may be detected based on feature points that are detected in the live view presented via a display of the computing device. The foregoing technique will now be described with reference to FIG. 4. FIG. 4 depicts a block diagram of an annotation engine 400 that is configured to detect surfaces in a live view displayed by a computing device in accordance with an example embodiment. Annotation engine 400 is an example of annotation engine 102, as described above with reference to FIG. 1. As shown in FIG. 4, annotation engine 400 comprises a feature point detector 402 and a surface detector 404.

Feature point detector 402 is configured to determine feature points within a live view (e.g., live view 112 or 212, as shown in FIGS. 1-2K). Feature point detector 402 may be configured to analyze each frame of the live view to detect visually distinctive features within the images (e.g., corners, blobs, edges, T-junctions, etc.). Each detected feature point may also be associated with a location or region in which the feature points are detected. Feature point detector 402 may utilize various sensors of the computing device and/or algorithms to detect feature points. Examples of sensors include, but are not limited to infrared sensors, RGB (red, green, blue) sensors or cameras (e.g., camera(s) 106, as shown in FIG. 1), etc. Examples of feature point detection algorithms include, but are not limited to, Scale Invariant Feature Transform (SIFT)-based detection algorithms, Speeded Up Robust Features (SURF)-based detection algorithms, Binary Robust Invariant Scalable Keypoints (BRISK)-based detection algorithms, and/or the like. The detected features (shown as feature points 406) are provided to surface detector 404.

Figure 5A:
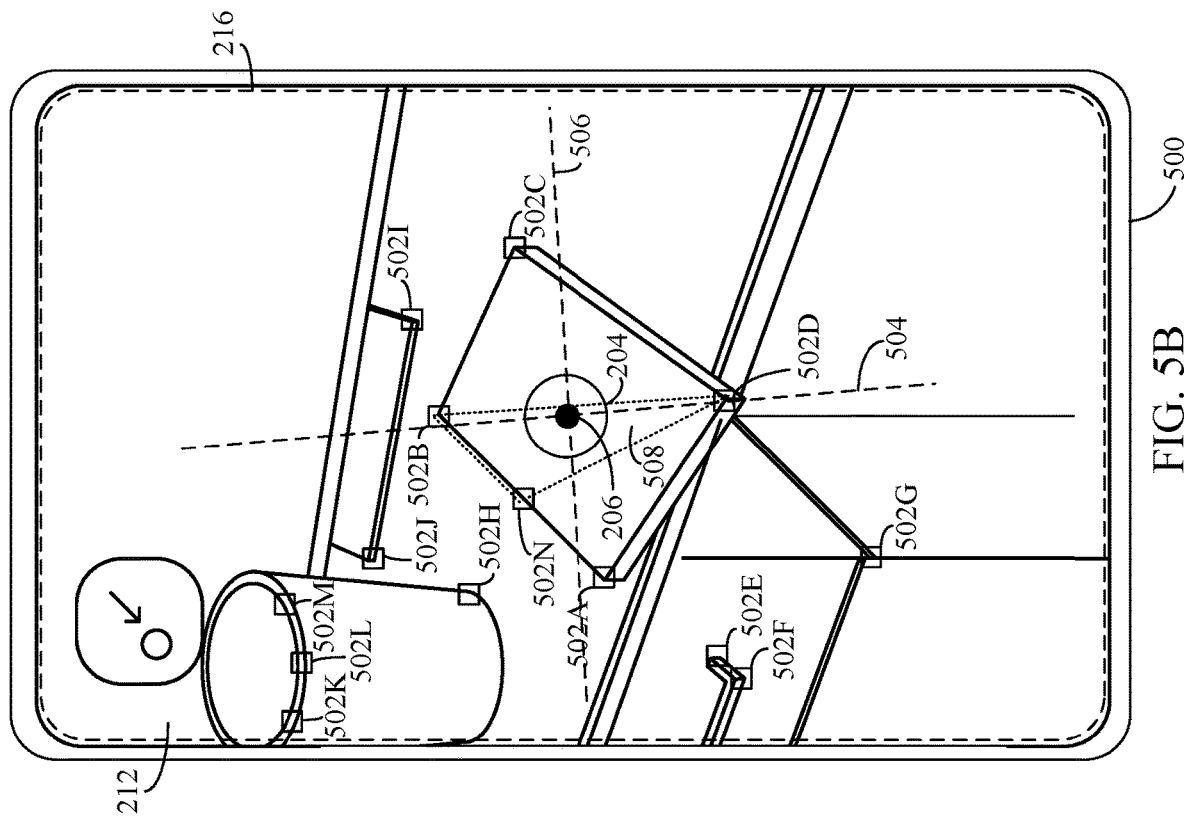
FIGS. 5A-5C depict graphical interfaces illustrating surface detection techniques in accordance with an example embodiment.

FIG. 5A depicts a live view 212 displayed via a camera of a smart phone 400 in which various feature points 502A-502N are detected in accordance with an example embodiment. Smart phone 500 is an example of smart phone 200, as described above with reference to FIG. 2. It is noted that feature points 502A-502N are depicted for the purpose of illustration and that any number of feature points may be detected in a particular frame of live view 212.

Referring again to FIG. 4, surface detector 404 is configured to detect planes depicted via the live view based on a grouping or cluster of feature points 406. For instance, surface detector 404 may be configured to detect the closest feature point of feature points that is closest to the center of central GUI element 204 (i.e., reticle dot 206). In the example shown in FIG. 5B, feature point 502D may be determined to be the feature point that is closest to reticle dot 206. Surface detector 404 may utilize various depth and/or distance determination algorithms known in the art to determine the distance between reticle dot 206 and feature points 502A-502N.

Figure 5B:
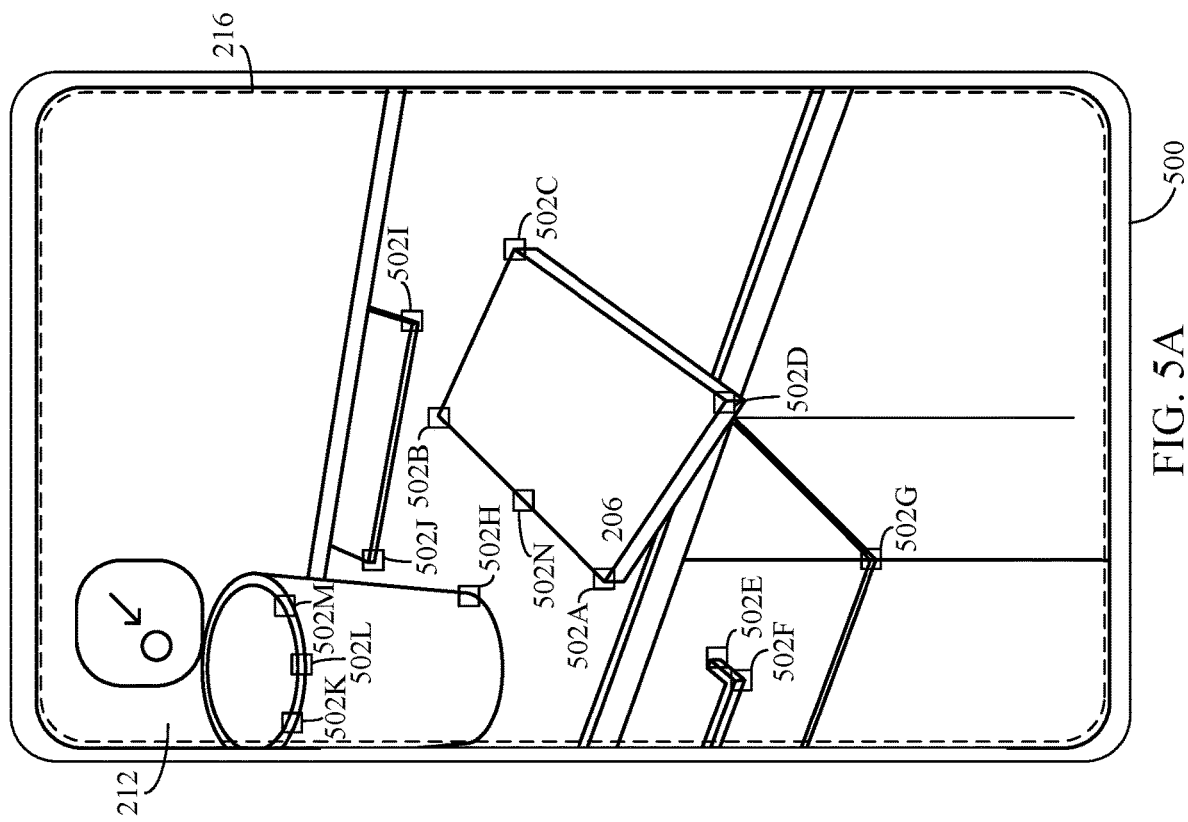

After determining the closest feature point, surface detector 404 may determine a first line that connects and/or passes through the feature point and the reticle dot. For example, as shown in FIG. 5B, surface detector 404 determines a first line 504, which connects and passes through reticle dot 206 and feature point 502D. It is noted that central GUI element 204 and reticle dot 206 are not shown as being co-planar with an underlying surface as the surface has not yet been detected in FIG. 5B.

Figure 5C:
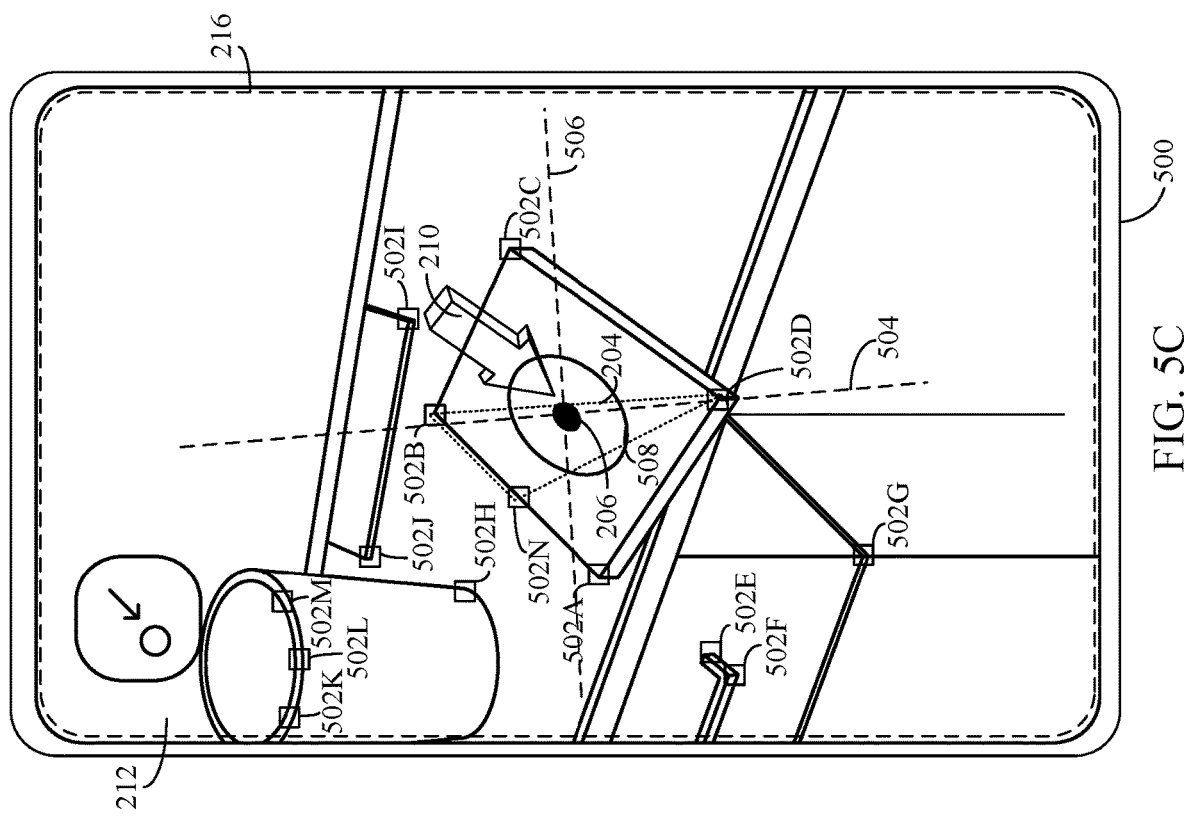

Thereafter, surface detector 404 determines a second line that is orthogonal to the first line. For example, as shown in FIG. 5B, surface detector 404 determines a second line 506 that is orthogonal to first line 504. The determined, closest feature point (i.e., feature point 502D) may be designated as being in a first region located on a first side of second line 506. Surface detector 404 then determines the closest feature point (i.e., a second feature point) to reticle dot 206 in a second region located on a second side of second line 506 that is opposite to the first side in which the first determined, closest feature point (i.e., feature point 502D) is detected. In the example shown in FIG. 5B, surface detector 404 may determine that feature point 502N is the closest feature point in the second region. Surface detector 404 may then determine a third feature point closest to reticle dot 206 that is located in a third region located on the second side of second line 506. The third region is on a side of first line 504 that is opposite to the side in which the second feature point (feature point 502N) is located. In the example shown in FIG. 5B, surface detector 404 determines that feature point 502B is the third feature point. After determining the three feature points, surface detector 404 generates a triangular plane 508 based on the three feature points. The determined triangular plane (triangular plane 508) is determined, by surface detector 404, to be the surface (i.e., surface 218, as shown in FIGS. 2I-2K) in live view 212 that is proximate to the center of live view 212. In response to determining triangular plane 508, annotation engine 400 renders central GUI element 204 and reticle dot 206 as being coplanar with triangular plane 508, along with three-dimensional arrow 210) (as shown in FIG. 5C).

Annotation engine 400 may maintain a record of feature points 502A-502N and their respective locations even when they are no longer in view (due to the user moving camera(s) 106 around the user's environment). When annotation engine 400 detects user input that locks and three-dimensional arrow 210, annotation engine 400 generates an anchor point relative to those points and associates three three-dimensional arrow 210 with that anchor. This way, when the anchor point becomes in view again, annotation engine 400 re-renders three-dimensional arrow 210 with respect to the anchor point and previously-detected feature points 502A-502N.

Figure 6:
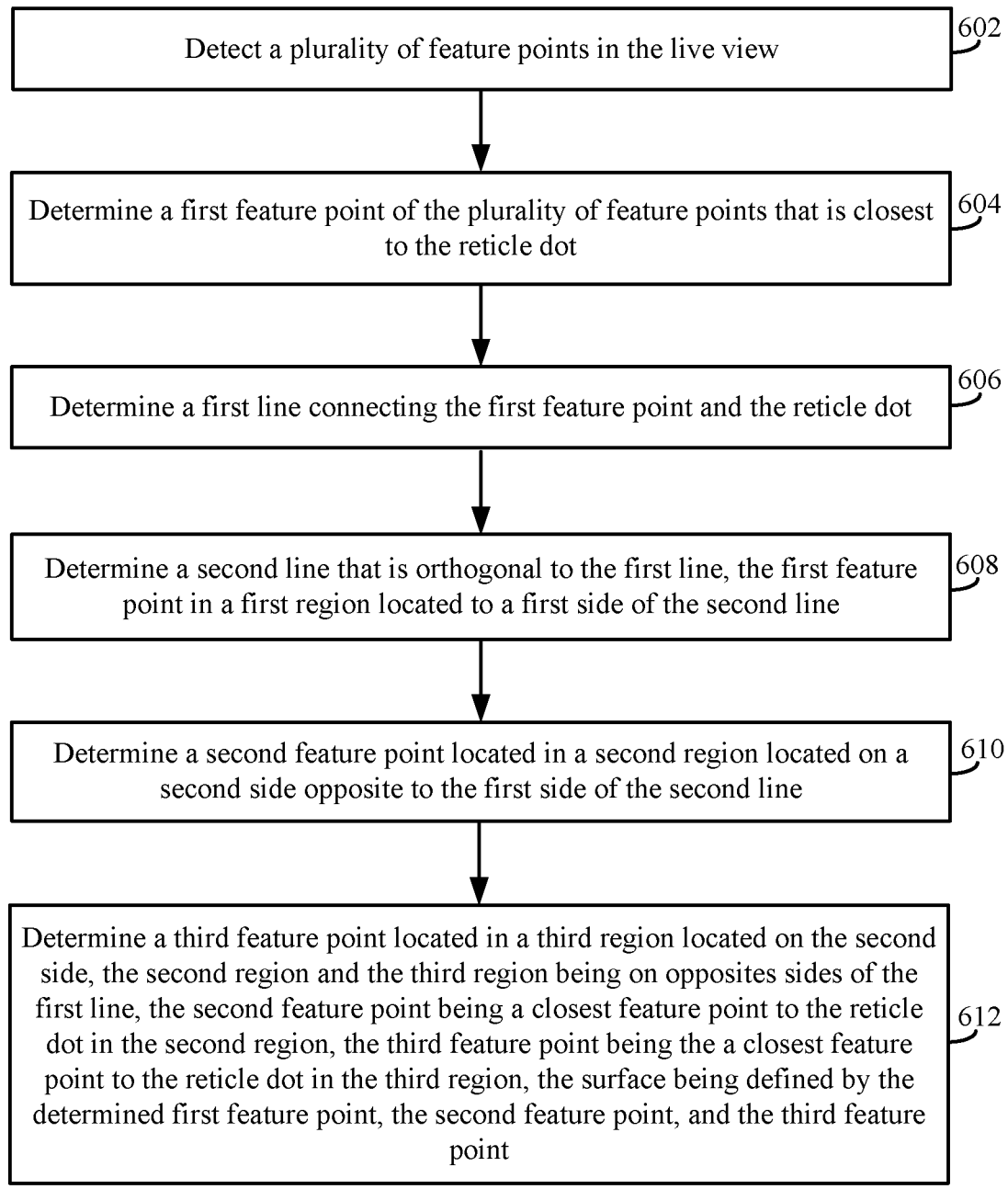
FIG. 6 shows a flowchart of a method for detecting a surface in a live view displayed by a computing device in accordance with an example embodiment.

Accordingly, a surface may be detected in a live view in many ways. For example, FIG. 6 shows a flowchart 600 of a method for detecting a surface in a live view in accordance with an example embodiment. In an embodiment, flowchart 600 may be implemented by annotation engine 400 shown in FIG. 4, although the method is not limited to that implementation. Accordingly, flowchart 600 will be described with continued reference to FIG. 4, along with FIG. 5B. Other structural and operational embodiments will be apparent to persons skilled in the relevant art(s) based on the discussion regarding flowchart 600 and annotation engine of FIG. 4.

Flowchart 600 begins with step 602. In step 602, a plurality of feature points in the live view are detected. For example, with reference to FIG. 4, feature point detector 402 determiner detects plurality of feature points 506 (shown as feature points 502A-502N in FIG. 5B).

In step 602, a first feature point of the plurality of feature points that is closest to the reticle dot is determined. For example, with reference to FIGS. 4 and 5B, surface detector 404 may receive a plurality of feature points 406 from feature point detector 402 and determine a first feature point (feature point 502D) of plurality of feature points 502A-502N that is closest to reticle dot 206.

In step 604, a first line connecting the first feature point and the reticle dot is determined. For example, with reference to FIGS. 4 and 5B, surface detector 404 determines first line 504 that connects feature point 502 and reticle dot 206.

In step 606, a second line that is orthogonal to the first line is determined. The first feature point is in a first region located to a first side of the second line. For example, with reference to FIGS. 4 and 5B, surface detector 404 determines second line 506 that is orthogonal to first line 504. Feature point 502D is in a first region located to a first side of second line 506.

In step 608, a second feature point located in a second region located on a second side opposite to the first side of the second line is determined. For example, with reference to FIGS. 4 and 5B, surface detector 404 determines second feature point 502N in a second region located on a second side opposite to the first side of second line 506.

In step 610, a third feature point located in a third region located on the second side is determined. The second region and the third region are on opposite sides of the first line, the second feature point is a closest feature point to the reticle dot in the second region, and the third feature point is the a closest feature point to the reticle dot in the third region. The surface detected proximate to the reticle dot is defined by the determined first feature point, the second feature point, and the third feature point. For example, with reference to FIGS. 4 and 5B, surface detector 404 determines third feature point 502B located in a third region located on the second side of second line 506. The second region and the third region are on opposite sides of first line 504. Feature point 502N is the closest feature point to reticle dot 206 in the second region, and feature point 502B is the closest feature point to reticle dot 206 in the third region. The surface detected proximate to reticle dot 206 is defined by feature points 502D, 502N and 502B.

III. Example Mobile and Stationary Device Embodiments

The systems and methods described above, including the graphical user interface for managing and configuring data items described in reference to FIGS. 1-6, may be implemented in hardware, or hardware combined with one or both of software and/or firmware. For example, computing device 100, display 108, GUI 114, annotation engine 102, imaging system 110, camera(s) 106, user interface(s) 104, smart phone 200, annotation engine 400, feature point detector 402, surface detector 404, and/or smart phone 500, and/or each of the components described therein, and flowchart 300 and/or 600 may be each implemented as computer program code/instructions configured to be executed in one or more processors and stored in a computer readable storage medium. Alternatively, computing device 100, display 108, GUI 114, annotation engine 102, imaging system 110, camera(s) 106, user interface(s) 104, smart phone 200, annotation engine 400, feature point detector 402, surface detector 404, and/or smart phone 500, and/or each of the components described therein, and flowchart 300 and/or 600 may be implemented as hardware logic/electrical circuitry. In an embodiment, computing device 100, display 108, GUI 114, annotation engine 102, imaging system 110, camera(s) 106, user interface(s) 104, smart phone 200, annotation engine 400, feature point detector 402, surface detector 404, and/or smart phone 500, and/or each of the components described therein, and flowchart 300 and/or 600 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
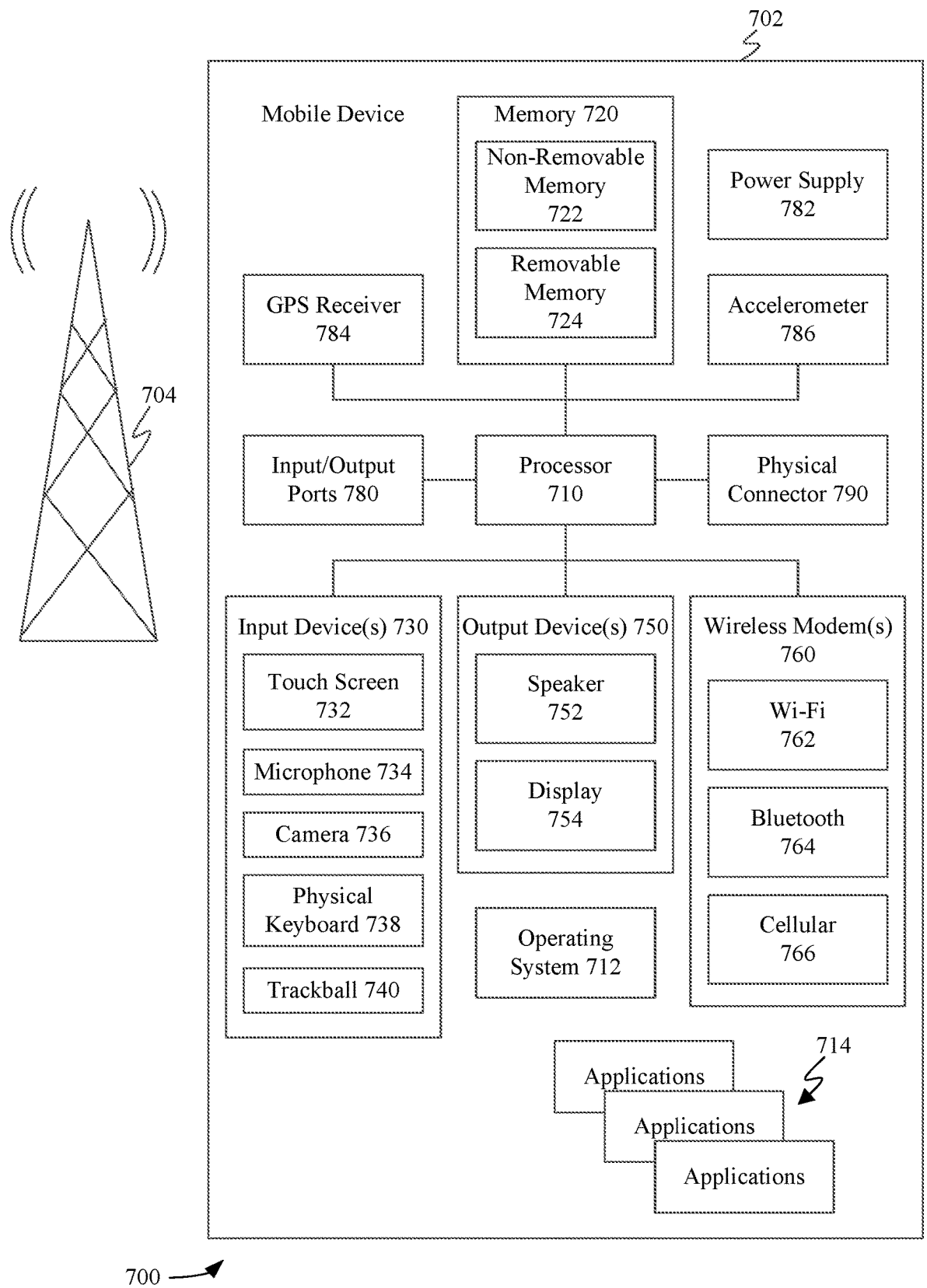
FIG. 7 is a block diagram of an exemplary user device in which embodiments may be implemented.

FIG. 7 shows a block diagram of an exemplary mobile device 700 including a variety of optional hardware and software components, shown generally as components 702. Any number and combination of the features/elements of computing device 100, display 108, GUI 114, annotation engine 102, imaging system 110, camera(s) 106, user interface(s) 104, smart phone 200, annotation engine 400, feature point detector 402, surface detector 404, and/or smart phone 500, and/or each of the components described therein, and flowchart 300 and/or 600 may be implemented as components 702 included in a mobile device embodiment, as well as additional and/or alternative features/elements, as would be known to persons skilled in the relevant art(s). It is noted that any of components 702 can communicate with any other of components 702, although not all connections are shown, for ease of illustration. Mobile device 700 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 704, such as a cellular or satellite network, or with a local area or wide area network.

The illustrated mobile device 700 can include a controller or processor referred to as processor circuit 710 for performing such tasks as signal coding, image processing, data processing, input/output processing, power control, and/or other functions. Processor circuit 710 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 710 may execute program code stored in a computer readable medium, such as program code of one or more applications 714, operating system 712, any program code stored in memory 720, etc. Operating system 712 can control the allocation and usage of the components 702 and support for one or more application programs 714 (a.k.a. applications, "apps", etc.). Application programs 714 can include common mobile computing applications (e.g., email applications, calendars, contact managers, web browsers, messaging applications) and any other computing applications (e.g., word processing applications, mapping applications, media player applications).

As illustrated, mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Subscriber Identity Module (SIM) card, which is well known in GSM communication systems, or other well-known memory storage technologies, such as "smart cards." The memory 720 can be used for storing data and/or code for running operating system 712 and applications 714. Example data can include web pages, text, images, sound files, video data, or other data sets to be sent to and/or received from one or more network servers or other devices via one or more wired or wireless networks. Memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 720. These programs include operating system 712, one or more application programs 714, and other program modules and program data. Examples of such application programs or program modules may include, for example, computer program logic (e.g., computer program code or instructions) for implementing the systems described above, including the embodiments described in reference to FIGS. 1-6.

Mobile device 700 can support one or more input devices 730, such as a touch screen 732, microphone 734, camera 736, physical keyboard 738 and/or trackball 740 and one or more output devices 750, such as a speaker 752 and a display 754.

Other possible output devices (not shown) can include piezoelectric or other haptic output devices. Some devices can serve more than one input/output function. For example, touch screen 732 and display 754 can be combined in a single input/output device. The input devices 730 can include a Natural User Interface (NUI).

Wireless modem(s) 760 can be coupled to antenna(s) (not shown) and can support two-way communications between processor circuit 710 and external devices, as is well understood in the art. The modem(s) 760 are shown generically and can include a cellular modem 766 for communicating with the mobile communication network 704 and/or other radio-based modems (e.g., Bluetooth 764 and/or Wi-Fi 762). Cellular modem 766 may be configured to enable phone calls (and optionally transmit data) according to any suitable communication standard or technology, such as GSM, 3G, 4G, 5G, etc. At least one of the wireless modem(s) 760 is typically configured for communication with one or more cellular networks, such as a GSM network for data and voice communications within a single cellular network, between cellular networks, or between the mobile device and a public switched telephone network (PSTN).

Mobile device 700 can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port. The illustrated components 702 are not required or all-inclusive, as any components can be not present and other components can be additionally present as would be recognized by one skilled in the art.

Figure 8:
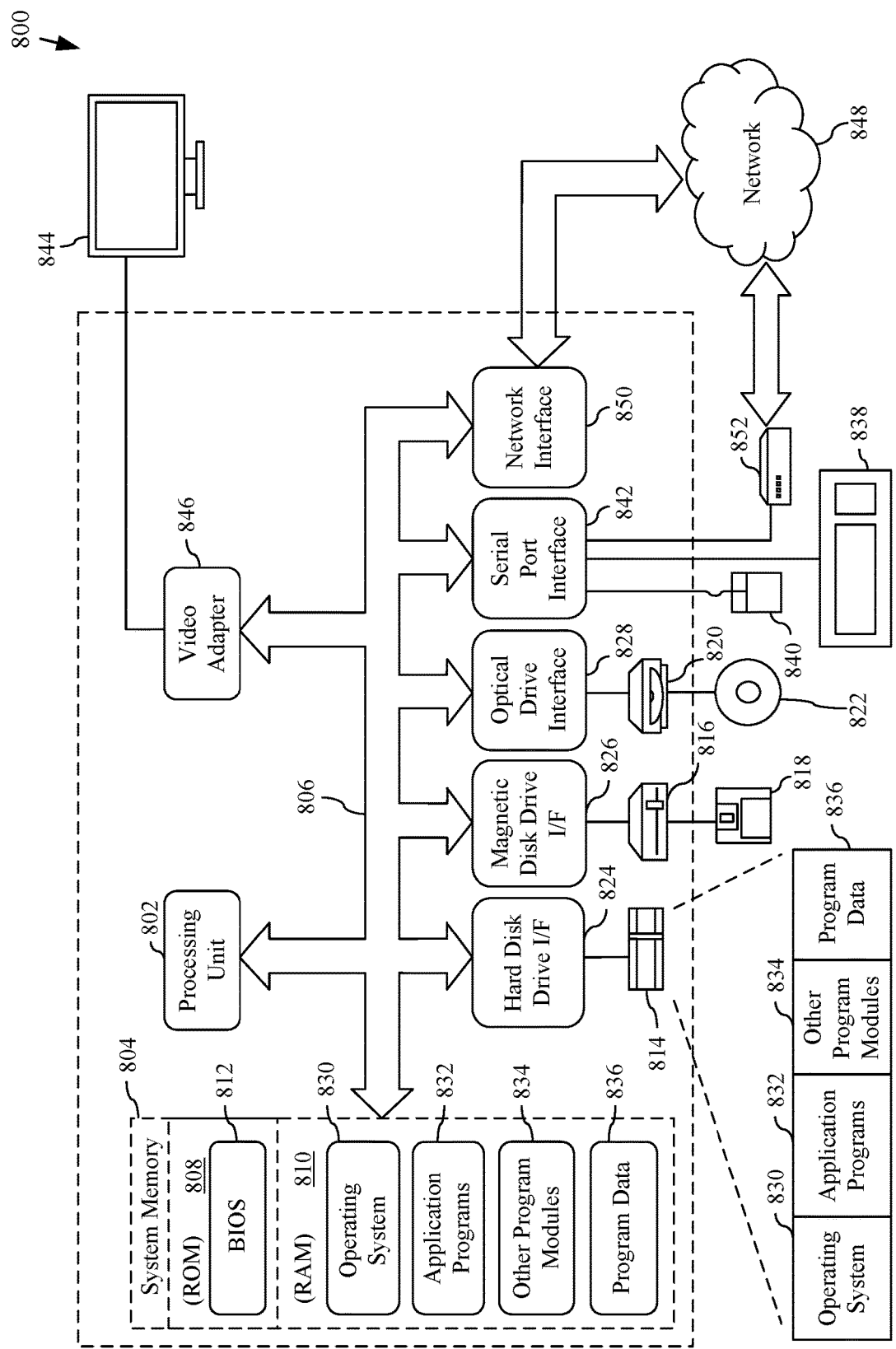
FIG. 8 is a block diagram of an example processor-based computer system that may be used to implement various embodiments.

Furthermore, FIG. 8 depicts an exemplary implementation of a computing device 800 in which embodiments may be implemented, including computing device 100, display 108, GUI 114, annotation engine 102, imaging system 110, camera(s) 106, user interface(s) 104, smart phone 200, annotation engine 400, feature point detector 402, surface detector 404, and/or smart phone 500, and/or each of the components described therein, and flowchart 300 and/or 600. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing the systems described above, including the embodiments described in reference to FIGS. 1-6.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to generally refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media (including system memory 804 of FIG. 8). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 852, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A method performed by a computing device is described herein. The method includes: rendering a graphical user interface element that is locked to a center of a live view provided by one or more cameras of the computing device, the graphical user interface element being rendered in a three-dimensional virtual overlay space and being coplanar with a surface detected proximate to the center of the live view; rendering a three-dimensional arrow at a first position in the three-dimensional virtual overlay space, the three-dimensional arrow pointed towards a center of the graphical user interface element; rotating the three-dimensional arrow around the center of the graphical user interface element to a second position in the three-dimensional virtual overlay space in response to first user input, the three-dimensional arrow being continuously pointed at the center of the graphical user interface element during said rotating; locking the three-dimensional arrow to the second position based on second user input; and anchoring, in the three-dimensional virtual overlay space, the three-dimensional arrow to the surface.

In one implementation of the foregoing method, the graphical user interface element is a circular reticle comprising a reticle dot centrally-located within the circular reticle.

In one implementation of the foregoing method, the method further comprises: based on the first user input, rendering at least a portion of a circular graphical user interface element that at least partially encircles the reticle dot, wherein the three-dimensional arrow is positioned inside the rendered at least a portion of the circular graphical user interface.

In one implementation of the foregoing method, the rendered at least a portion of the circular graphical user interface dynamically changes during said rotating such that the rendered portion is proximate to an end of the three-dimensional arrow that is distal to the graphical user interface element locked to the center of the live view.

In one implementation of the foregoing method, the surface is detected by: detecting a plurality of feature points in the live view; determining a first feature point of the plurality of feature points that is closest to the reticle dot; determining a first line connecting the first feature point and the reticle dot; determining a second line that is orthogonal to the first line, the first feature point in a first region located to a first side of the second line; determining a second feature point located in a second region located on a second side opposite to the first side of the second line; and determining a third feature point located in a third region located on the second side, the second region and the third region being on opposites sides of the first line, the second feature point being a closest feature point to the reticle dot in the second region, the third feature point being the a closest feature point to the reticle dot in the third region, the surface being defined by the determined first feature point, the second feature point, and the third feature point.

In one implementation of the foregoing method, the three-dimensional arrow is translucent during said rendering the three-dimensional arrow at the first position and is opaque during said rotating.

In one implementation of the foregoing method, the method further comprises: subsequent to said locking, rendering a second three-dimensional arrow at the first position, the second three-dimensional arrow pointed towards the center of the graphical user interface element locked to the center of the live view.

A system in accordance with any of the embodiments described herein is also disclosed. The system includes: at least one processor circuit; and at least one memory that stores program code configured to be executed by the at least one processor circuit, the program code comprising: an annotation engine configured to: render a graphical user interface element that is locked to a center of a live view provided by the at least one camera of the system, the graphical user interface element being rendered in a three-dimensional virtual overlay space and being coplanar with a surface detected proximate to the center of the live view; render a three-dimensional arrow at a first position in the three-dimensional virtual overlay space, the three-dimensional arrow pointed towards a center of the graphical user interface element; rotate the three-dimensional arrow around the center of the graphical user interface element to a second position in the three-dimensional virtual overlay space in response to first user input, the three-dimensional arrow being continuously pointed at the center of the graphical user interface element during said rotating; lock the three-dimensional arrow to the second position based on second user input; and anchor, in the three-dimensional virtual overlay space, the three-dimensional arrow to the surface.

In one implementation of the foregoing system, the graphical user interface element is a circular reticle comprising a reticle dot centrally-located within the circular reticle.

In one implementation of the foregoing system, the annotation engine is further configured to: based on the first user input, render at least a portion of a circular graphical user interface element that at least partially encircles the reticle dot, wherein the three-dimensional arrow is positioned inside the rendered at least a portion of the circular graphical user interface.

In one implementation of the foregoing system, the rendered at least a portion of the circular graphical user interface dynamically changes during said rotating such that the rendered portion is proximate to an end of the three-dimensional arrow that is distal to the graphical user interface element locked to the center of the live view.

In one implementation of the foregoing system, the annotation engine is further configured to: detect a plurality of feature points in the live view; determine a first feature point of the plurality of feature points that is closest to the reticle dot; determine a first line connecting the first feature point and the reticle dot; determine a second line that is orthogonal to the first line, the first feature point in a first region located to a first side of the second line; determine a second feature point located in a second region located on a second side opposite to the first side of the second line; and determine a third feature point located in a third region located on the second side, the second region and the third region being on opposites sides of the first line, the second feature point being a closest feature point to the reticle dot in the second region, the third feature point being the a closest feature point to the reticle dot in the third region, the surface being defined by the determined first feature point, the second feature point, and the third feature point.

In one implementation of the foregoing system, the three-dimensional arrow is translucent during said rendering the three-dimensional arrow at the first position and is opaque during said rotating.

In one implementation of the foregoing system, the annotation engine is further configured to: subsequent to said locking, render a second three-dimensional arrow at the first position, the second three-dimensional arrow pointed towards the center of the graphical user interface element locked to the center of the live view.

A computer-readable storage medium having program instructions recorded thereon that, when executed by at least one processor, perform a method. The method includes: rendering a graphical user interface element that is locked to a center of a live view provided by one or more cameras of the computing device, the graphical user interface element being rendered in a three-dimensional virtual overlay space and being coplanar with a surface detected proximate to the center of the live view; rendering a three-dimensional arrow at a first position in the three-dimensional virtual overlay space, the three-dimensional arrow pointed towards a center of the graphical user interface element; rotating the three-dimensional arrow around the center of the graphical user interface element to a second position in the three-dimensional virtual overlay space in response to first user input, the three-dimensional arrow being continuously pointed at the center of the graphical user interface element during said rotating; locking the three-dimensional arrow to the second position based on second user input; and anchoring, in the three-dimensional virtual overlay space, the three-dimensional arrow to the surface.

In one implementation of the foregoing computer-readable storage medium, the graphical user interface element is a circular reticle comprising a reticle dot centrally-located within the circular reticle.

In one implementation of the foregoing computer-readable storage medium, the method further comprises: based on the first user input, rendering at least a portion of a circular graphical user interface element that at least partially encircles the reticle dot, wherein the three-dimensional arrow is positioned inside the rendered at least a portion of the circular graphical user interface.

In one implementation of the foregoing computer-readable storage medium, the rendered at least a portion of the circular graphical user interface dynamically changes during said rotating such that the rendered portion is proximate to an end of the three-dimensional arrow that is distal to the graphical user interface element locked to the center of the live view.

In one implementation of the foregoing computer-readable storage medium, the surface is detected by: detecting a plurality of feature points in the live view; determining a first feature point of the plurality of feature points that is closest to the reticle dot; determining a first line connecting the first feature point and the reticle dot; determining a second line that is orthogonal to the first line, the first feature point in a first region located to a first side of the second line; determining a second feature point located in a second region located on a second side opposite to the first side of the second line; and determining a third feature point located in a third region located on the second side, the second region and the third region being on opposites sides of the first line, the second feature point being a closest feature point to the reticle dot in the second region, the third feature point being the a closest feature point to the reticle dot in the third region, the surface being defined by the determined first feature point, the second feature point, and the third feature point.

In one implementation of the foregoing computer-readable storage medium, the three-dimensional arrow is translucent during said rendering the three-dimensional arrow at the first position and is opaque during said rotating.

V. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:

1. A method performed by a computing device, comprising:
    rendering a graphical user interface element that is locked to a center of a live view provided by one or more cameras of the computing device, the graphical user interface element being rendered in a three-dimensional virtual overlay space and being coplanar with a surface detected proximate to the center of the live view;
    rendering a three-dimensional arrow at a first position in the three-dimensional virtual overlay space, the three-dimensional arrow pointed towards a center of the graphical user interface element;
    rotating the three-dimensional arrow around the center of the graphical user interface element to a second position in the three-dimensional virtual overlay space in response to first user input, the three-dimensional arrow being continuously pointed at the center of the graphical user interface element during said rotating;
    locking the three-dimensional arrow to the second position based on second user input; and
    anchoring, in the three-dimensional virtual overlay space, the three-dimensional arrow to the surface.

2. The method of claim 1, wherein the graphical user interface element is a circular reticle comprising a reticle dot centrally-located within the circular reticle.

3. The method of claim 2, further comprising:
    based on the first user input, rendering at least a portion of a circular graphical user interface element that at least partially encircles the reticle dot, wherein the three-dimensional arrow is positioned inside the rendered at least a portion of the circular graphical user interface.

4. The method of claim 3, wherein the rendered at least a portion of the circular graphical user interface dynamically changes during said rotating such that the rendered portion is proximate to an end of the three-dimensional arrow that is distal to the graphical user interface element locked to the center of the live view.

5. The method of claim 1, wherein the surface is detected by:
   detecting a plurality of feature points in the live view;
   determining a first feature point of the plurality of feature points that is closest to the reticle dot;
   determining a first line connecting the first feature point and the reticle dot;
   determining a second line that is orthogonal to the first line, the first feature point in a first region located to a first side of the second line;
   determining a second feature point located in a second region located on a second side opposite to the first side of the second line; and
   determining a third feature point located in a third region located on the second side, the second region and the third region being on opposites sides of the first line, the second feature point being a closest feature point to the reticle dot in the second region, the third feature point being the a closest feature point to the reticle dot in the third region, the surface being defined by the determined first feature point, the second feature point, and the third feature point.

6. The method of claim 1, wherein the three-dimensional arrow is translucent during said rendering the three-dimensional arrow at the first position and is opaque during said rotating.

7. The method of claim 1, further comprising:
   subsequent to said locking, rendering a second three-dimensional arrow at the first position, the second three-dimensional arrow pointed towards the center of the graphical user interface element locked to the center of the live view.

8. A system, comprising:
   at least one camera;
   at least one processor circuit; and
   at least one memory that stores program code configured to be executed by the at least one processor circuit, the program code comprising:
      an annotation engine configured to:
         render a graphical user interface element that is locked to a center of a live view provided by the at least one camera of the system, the graphical user interface element being rendered in a three-dimensional virtual overlay space and being coplanar with a surface detected proximate to the center of the live view;
         render a three-dimensional arrow at a first position in the three-dimensional virtual overlay space, the three-dimensional arrow pointed towards a center of the graphical user interface element;
         rotate the three-dimensional arrow around the center of the graphical user interface element to a second position in the three-dimensional virtual overlay space in response to first user input, the three-dimensional arrow being continuously pointed at the center of the graphical user interface element during said rotating;
         lock the three-dimensional arrow to the second position based on second user input; and
         anchor, in the three-dimensional virtual overlay space, the three-dimensional arrow to the surface.

9. The system of claim 8, wherein the graphical user interface element is a circular reticle comprising a reticle dot centrally-located within the circular reticle.

10. The system of claim 9, wherein the annotation engine is further configured to:
    based on the first user input, render at least a portion of a circular graphical user interface element that at least partially encircles the reticle dot, wherein the three-dimensional arrow is positioned inside the rendered at least a portion of the circular graphical user interface.

11. The system of claim 10, wherein the rendered at least a portion of the circular graphical user interface dynamically changes during said rotating such that the rendered portion is proximate to an end of the three-dimensional arrow that is distal to the graphical user interface element locked to the center of the live view.

12. The system of claim 8, wherein the annotation engine is further configured to:
    detect a plurality of feature points in the live view;
    determine a first feature point of the plurality of feature points that is closest to the reticle dot;
    determine a first line connecting the first feature point and the reticle dot;
    determine a second line that is orthogonal to the first line, the first feature point in a first region located to a first side of the second line;
    determine a second feature point located in a second region located on a second side opposite to the first side of the second line; and
    determine a third feature point located in a third region located on the second side, the second region and the third region being on opposites sides of the first line, the second feature point being a closest feature point to the reticle dot in the second region, the third feature point being the a closest feature point to the reticle dot in the third region, the surface being defined by the determined first feature point, the second feature point, and the third feature point.

13. The system of claim 8, wherein the three-dimensional arrow is translucent during said rendering the three-dimensional arrow at the first position and is opaque during said rotating.

14. The system of claim 8, wherein the annotation engine is further configured to:
    subsequent to said locking, render a second three-dimensional arrow at the first position, the second three-dimensional arrow pointed towards the center of the graphical user interface element locked to the center of the live view.

15. A computer-readable storage medium having program instructions recorded thereon that, when executed by at least one processor of a computing device, perform a method, the method comprising:
    rendering a graphical user interface element that is locked to a center of a live view provided by one or more cameras of the computing device, the graphical user interface element being rendered in a three-dimensional virtual overlay space and being coplanar with a surface detected proximate to the center of the live view;
    rendering a three-dimensional arrow at a first position in the three-dimensional virtual overlay space, the three-dimensional arrow pointed towards a center of the graphical user interface element;
    rotating the three-dimensional arrow around the center of the graphical user interface element to a second position in the three-dimensional virtual overlay space in response to first user input, the three-dimensional arrow being continuously pointed at the center of the graphical user interface element during said rotating;

locking the three-dimensional arrow to the second position based on second user input; and anchoring, in the three-dimensional virtual overlay space, the three-dimensional arrow to the surface.

16. The computer-readable storage medium of claim 15, wherein the graphical user interface element is a circular reticle comprising a reticle dot centrally-located within the circular reticle.

17. The computer-readable storage medium of claim 16, the method further comprising:

based on the first user input, rendering at least a portion of a circular graphical user interface element that at least partially encircles the reticle dot, wherein the three-dimensional arrow is positioned inside the rendered at least a portion of the circular graphical user interface.

18. The computer-readable storage medium of claim 17, wherein the rendered at least a portion of the circular graphical user interface dynamically changes during said rotating such that the rendered portion is proximate to an end of the three-dimensional arrow that is distal to the graphical user interface element locked to the center of the live view.

19. The computer-readable storage medium of claim 15, wherein the surface is detected by:

detecting a plurality of feature points in the live view;

determining a first feature point of the plurality of feature points that is closest to the reticle dot;

determining a first line connecting the first feature point and the reticle dot;

determining a second line that is orthogonal to the first line, the first feature point in a first region located to a first side of the second line;

determining a second feature point located in a second region located on a second side opposite to the first side of the second line; and determining a third feature point located in a third region located on the second side, the second region and the third region being on opposites sides of the first line, the second feature point being a closest feature point to the reticle dot in the second region, the third feature point being the a closest feature point to the reticle dot in the third region, the surface being defined by the determined first feature point, the second feature point, and the third feature point.

20. The computer-readable storage medium of claim 15, wherein the three-dimensional arrow is translucent during said rendering the three-dimensional arrow at the first position and is opaque during said rotating.

* * * * *